United States Patent [19]
Furuya

[11] Patent Number: 5,654,776
[45] Date of Patent: Aug. 5, 1997

[54] MULTISCREEN DISPLAYING APPARATUS

[75] Inventor: Keizo Furuya, Saitama-ken, Japan

[73] Assignee: Kabushiki Kaisha Toshiba, Kawasaki, Japan

[21] Appl. No.: 542,790

[22] Filed: Oct. 13, 1995

[30] Foreign Application Priority Data

Oct. 14, 1994 [JP] Japan ............................. 6-249396
Nov. 2, 1994 [JP] Japan ............................. 6-270022

[51] Int. Cl.$^6$ ........................... H04N 5/64; H04N 5/645
[52] U.S. Cl. ........................... 348/789; 348/787; 348/840
[58] Field of Search ........................... 348/840, 839, 348/843, 836, 826, 827, 787, 788, 789, 588, 383, 794; 312/7.2; H04N 7/00, 5/64, 5/645, 5/65, 5/655

[56] References Cited

U.S. PATENT DOCUMENTS

| | | | |
|---|---|---|---|
| 4,903,137 | 2/1990 | Wakasa | 348/383 |
| 5,264,941 | 11/1993 | Nakano et al. | 348/383 |

FOREIGN PATENT DOCUMENTS

| | | | |
|---|---|---|---|
| 4-212580 | 8/1992 | Japan . | |
| 3-238436 | 3/1993 | Japan . | |
| 5-056375 | 3/1993 | Japan . | |
| 5316454 | 11/1993 | Japan | H04N 5/74 |
| 6178241 | 6/1994 | Japan | H04N 5/74 |
| 6292112 | 10/1994 | Japan | H04N 5/74 |

*Primary Examiner*—Michael H. Lee
*Attorney, Agent, or Firm*—Cushman Darby & Cushman, IP Group of Pillsbury Madison & Sutro, LLP

[57] ABSTRACT

A projecting unit is divided into substantial halves of a front cabinet provided with a screen on the front surface and a rear cabinet holding an optical unit box in the interior. The rear cabinet is fitted slidably and containably inside the front cabinet and is formed to be basket-shaped so that the greater part of the optical unit box may be exposed directly to the outside. Thereby, the projecting unit can be made light and compact and the transporting, installing and storing operability can be made efficient. Further, said screen can be fitted slidably forward and rearward to the front end part of the front cabinet by means of a screen pressing metal fixture and, even when plural projecting units are piled up, the screen will be able to be simply replaced.

23 Claims, 17 Drawing Sheets

PULLING-OUT OPERATION

PULLING-OUT OPERATION

FIG.11(a)
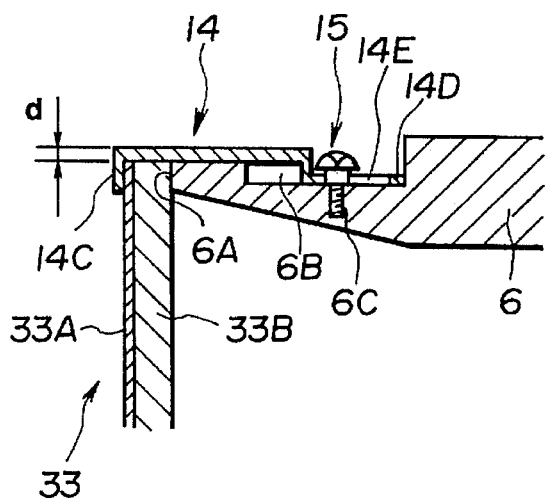
FIG.11(e)
FIG.11(b)
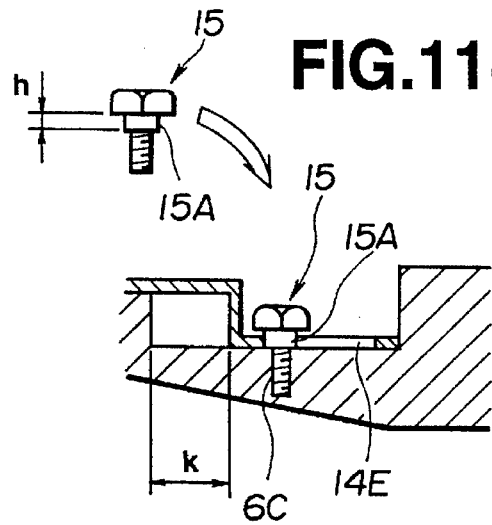
FIG.11(c)
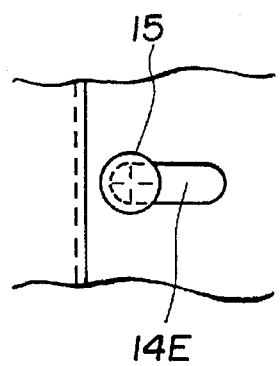
FIG.11(d)
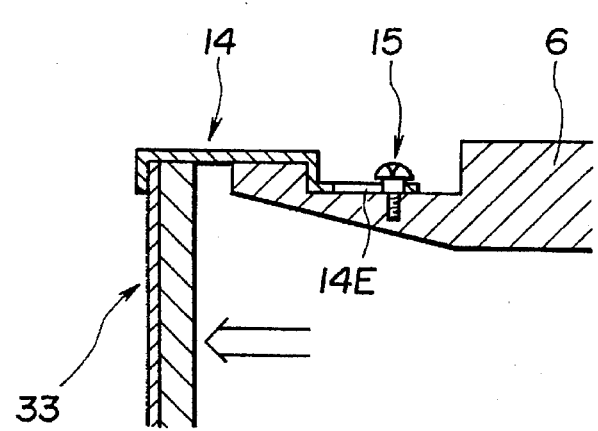
FIG.11(f)
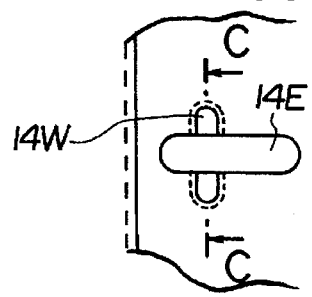
FIG.11(g)
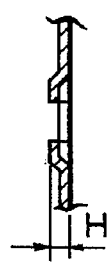

MULTISCREEN DISPLAYING APPARATUS

BACKGROUND OF THE INVENTION

1. Field of the Invention

This invention relates to multiscreen displaying apparatus and more particularly to a PJ unit cabinet structure and screen fitting structure in a multiscreen displaying apparatus made a wide screen by vertically and horizontally piling plural small size projecting units (also called cubic projecting displays mentioned as PJ units hereinafter) to provide a large picture apparatus for business.

2. Description of the Related Art

A large type video projector as a large picture displaying apparatus has been developed so that many people at once may see and hear a video. Three CRT picture images are provided corresponding to three primary colors of red, blue and green onto a large screen of about 40 to 60 inches and is of a front surface projecting type and back surface projecting type.

Nowadays, the performance of such large projecting type projector can be said to have considerably improved but is somewhat inferior to that of the CRT display in the picture brightness and the directivity. On the other hand, the CRT display has been popularized for the home television receiver but its 40 inch type is said to be the limit of the size.

Therefore, recently, in order to realize a large type screen over 60 inches, a system realizing a large picture as a whole by combining plural sets of small pictures has come to be used rather than one large picture. A multiscreen displaying apparatus made a wide screen by vertically and horizontally piling plural small size PJ units which are, for example, the above mentioned back surface projecting type projectors has come to be standard.

FIG. 24 shows a PJ unit alone of a conventional multiscreen displaying apparatus.

In FIG. 24, a cabinet of a PJ unit 30A consists of a barrel 31, a screen 33 and a screen fitting frame 32 for fitting the screen 33. An optical unit box (projector) consisting of a circuit part, projecting tube part and lens part not illustrated is contained inside the barrel 31. As clear from the same drawing, the total length of the cabinet of the PJ unit 30A combining the length of the barrel 31 with the length of the screen fitting frame 32 is determined by such distance at which a video of a size equal to the size of the screen 33 will be projected when the projected light from the above mentioned optical unit box (projector) 34 forms a focus normal in the optical design.

FIG. 25 shows a multiscreen displaying apparatus formed by vertically and horizontally piling conventional PJ units alone. Here, a multiscreen displaying apparatus formed of four PJ units 30A, 30B, 30C and 30D shall be explained as an example.

In FIG. 25, screens 33, 35, 36 and 37 arranged respectively on the front surfaces of the PJ units 30A, 30B, 30C and 30D are finished to be of structures so high in the rectangular precision as no slightest gap will be produced between the respective adjacent screens, that is, between the respective PJ units when the PJ units 30A to 30D are piled to be the multiscreen displaying apparatus.

Now, in said apparatus, as described above, the total length (equal to the sum of the length of the screen fitting frame 32 and the length of the barrel 31) is of the size equal to the normal dimension in the optical design, the unit of this long total length as it is must be transported, stored and assembled (that is, assembled into the multiscreen display) and, when it is necessary to rotate the cabinet in the installing operation particularly in a place narrow in the depth, the reduction in the operability will be remarkable.

The space from the optical unit box 34 to the screen 33 is merely hollow and is not effective except when a video is being projected. That is to say, it is necessary to transport a useless volume in the transportation and a wide (useless) storing space is required in the storing.

Further, as the optical unit box 34 and barrel 31 are of double structures in the rear of the cabinet, the weight of the materials by the double structures will be duplicated and the production cost will rise. Particularly, the influence of the weight will be large in case many plural PJ units are piled up to form a large picture, the slightest increase of the weight of each PJ unit of one set will have a very large influence on the total weight of the PJ units forming the large picture and will cause a grave influence on the load-resisting strength and handling ease of the cabinet, for example, when the units are piled up.

FIG. 26 is a cross-sectioned view on line A—A in FIG. 25.

As in FIG. 26, the cabinet of the PJ unit 30A is provided with a barrel 31, screen fitting frame 32, screen 33 and screen pressing metal fixture 38.

Said screen 33 consists of a Fresnel part 33B on the back surface side and a lenticular part 33A on the front surface side and is held by the screen fitting frame 32 and screen pressing metal fixture 38. This screen fitting frame 32 is formed to enclose the outer periphery of the screen 33.

The screen fitting frame 32 consists of a locking part 32A formed to be bent to the surface side of the screen 33 and a frame part 32B formed to enclose the outer periphery. The frame part 32B of this screen fitting frame 32 is fastened and secured to the barrel 31 with screws 39. By the way, this screw 39 is such flat head screw 39 that the screw head may come into the surface including the outer peripheral surface of the screen fitting frame 32 so that the adjacent PJ units (for example, 30A and 30B) may not hurt each other.

On the other hand, a screen pressing metal fixture 38 is provided on the screen back surface side so that the screen 33 may be inserted between this screen pressing metal fixture 38 and the locking part 32A of said screen fitting frame 32. This screen pressing metal fixture 38 is made of a plate-like member bent at one end to intersect substantially at right angles with the flat surface part including the end on the opposite side. The screen 33 is to be inserted between this bent part 38A and said locking part 32A. A hole a little larger than the screw diameter is made in this fitting screen pressing metal fixture 38 so that a screw 40 may come in through the hole. When the screw 40 is screwed from this hole into a screw hole provided in the screen fitting frame 32, this screen pressing metal fixture 38 will be fixed.

By the way, on the screen side surface of the screen fitting frame 32, a space part 41 is provided between the screen outer periphery and the screen fitting frame so that the screen 33 may be held by a proper tension. The other PJ units 30B to 30D are also of the same formation.

However, in such apparatus, after the plural PJ units 30A to 30D are piled up, in case such maintaining operation as replacing the screen is to be made, after all the other PJ units than the PJ unit in which the screen is to be replaced are removed, the operation will have to be made and thus there has been a very troublesome problem. This is because the flat head screw 39 used to fix the screen fitting frame 32 can not be removed with the multiscreen display assembled as it is. Therefore, there has been a problem that, in case the number of the piled PJ units increases, the troubles caused in the replacing operation will be unmeasurable.

Such material high in the optical characteristics as, for example, an acrylic material is used for the screen 33. On the other hand, from the viewpoint of the light weight and rigidity, an aluminum material is used for the screen fitting frame 32. Therefore, as the elongation and shrinkage due to the temperature and humidity will be different and in order to keep the screen 33 flat, the space part 41 will have to be provided between the screen fitting frame 32 and the screen 33 outer periphery. Therefore, since it is necessary for the locking part 32A to have a large width dimension, there have been problems that the boundary between the PJ units 30A to 30D will become large and the picture will become hard to see.

SUMMARY OF THE INVENTION

An object of the present invention is to provide a multiscreen displaying apparatus wherein the transporting operation, storing operation, installing operation and component displacing operation can be made efficiently and the operability can be improved.

Another object of the present invention is to provide a multiscreen displaying apparatus wherein the space can be reduced in the transportation and storing and the operability in piling up the PJ units in the plural PJ units installing operation and the like can be improved.

Further, another object of the present invention is to provide a multiscreen displaying apparatus wherein the screen displacing operation is made efficient.

A multiscreen displaying apparatus according to the first invention is:

A multiscreen displaying apparatus formed of plural projecting units to produce large type multivideos, comprising:

projecting units each having a structure divided substantially into halves of a front cabinet and rear cabinet;

a screen fitted to said front cabinet and displaying a video projected from the back surface side;

an optical unit box held within said rear cabinet and containing a function comprising a circuit part, projecting tube part and lens part to project videos onto said screen; and a mechanism slidably containing said rear cabinet inside said front cabinet;

wherein said screen is fitted slidably forward and rearward to the front end part of said front cabinet by means of a screen holding means; and said rear cabinet is formed to be basket-like so that the most of said optical unit box may be exposed directly to the outer part.

According to the first invention, the rear cabinet can be slidably contained in the front cabinet and the structure of the rear cabinet is made basket-like (frame-like) so that the most of the optical unit box may be exposed directly to the outer part so that, in the transportation, installing and storing, the projecting unit may be light and compact and the operation in the transportation, installing and storing may be efficient.

Further, as the screen can be fitted slidably forward and rearward to the front end part of the cabinet by the screen holding means, even when the plural projecting units are piled up, the screen will be able to be pulled out forward and to be simply replaced.

The multiscreen displaying apparatus according to the second invention is:

A multiscreen displaying apparatus formed of plural projecting units to produce large type multivideos, comprising:

projecting units each having a structure divided substantially into halves of a front cabinet and rear cabinet;

a screen fitted to said front cabinet and displaying a video projected from the back surface side;

an optical unit box held within said rear cabinet and containing a function comprising a circuit part, projecting tube part and lens part to project videos onto said screen; and a mechanism slidably containing said rear cabinet inside said front cabinet;

wherein said rear cabinet is formed to be basket-like so that the greater part of said optical unit box may be exposed directly to the outer part.

According to the second invention, the rear cabinet can be slidably contained in the front cabinet and the structure of the rear cabinet is made basket-like (frame-like) so that the greater part of the optical unit box may be exposed directly to the outer part so that, in the transportation, installing and storing, the projecting unit may be light and compact and the operation in the transportation, installing and storing may be efficient. Also, the weight can be reduced by the part of the member having covered the rear cabinet, the production cost can be reduced, the heat radiation of the optical unit can be improved and the maintenance can be made easy.

The multiscreen displaying apparatus according to the third invention is:

A multiscreen displaying apparatus provided with a screen on the front surface and formed by vertically and horizontally arranging plural projecting units each containing an optical system expanding and projecting video lights onto the screen within a cabinet to produce large type multivideos, wherein said screen is forward and rearward slidably fitted to the front end part of said cabinet by a screen holding means.

According to the third invention, as the screen is forward and rearward slidably fitted to the front end part of the cabinet by the screen holding means, even when plural projecting units are piled up, the screen will be able to be pulled out forward and simply displaced.

BRIEF DESCRIPTION OF THE DRAWINGS

FIG. 11(a) is a sectioned view on line B—B in FIG. 10.

FIG. 11(b) is a magnified view of an essential part in FIG. 11(a).

FIG. 11(c) is a plan view of FIG. 11(b).

FIG. 11(d) is a sectioned view of FIG. 11(a) when the screen is forward pushed out of the back surface side.

FIG. 11(e) is a view showing the shape of a male screw.

FIG. 11(f) is a plan view showing a locking structure in the vicinity of a hole of the screen pressing metal fixture.

FIG. 11(g) is a sectioned view on line C—C in FIG. 11(f).

DETAILED DESCRIPTION OF THE PREFERRED EMBODIMENTS

Figure 1:
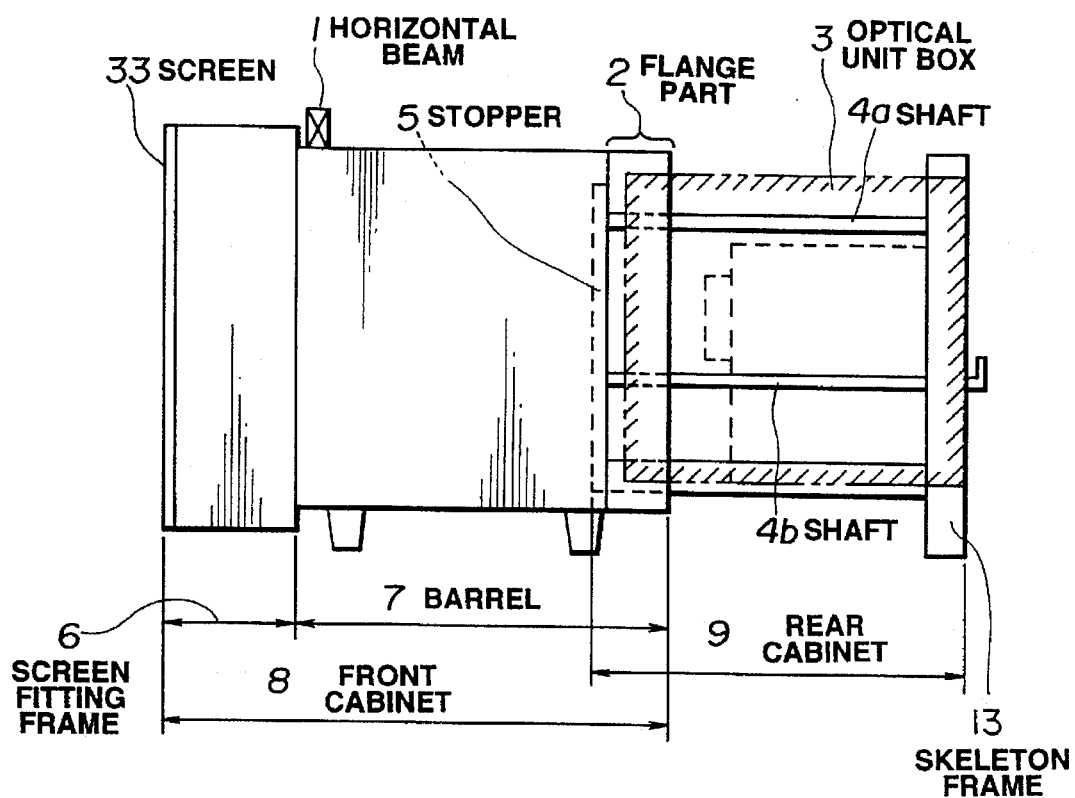
FIG. 1 is a view showing an embodiment of the structure of a PJ unit in a multiscreen displaying apparatus according to the present invention.

FIG. 1 is a view showing an embodiment of the structure of a PJ unit in a multiscreen displaying apparatus according to the present invention.

In FIG. 1, a PJ unit is divided into substantial halves of a front cabinet 8 and rear cabinet 9. The front cabinet 8 is formed of a screen fitting frame 6 to which a screen 33 is to be fitted and a barrel 7 having a horizontal beam 1 and a flange part 2. The rear cabinet 9 is formed of later described a skeleton frame 13, stoppers 5 and shafts 4a and 4b. In the inside of the rear cabinet 9, an optical unit box 3 containing a circuit part, projecting tube part and lens part producing video images to be projected onto the screen 33 is held.

Figure 2:
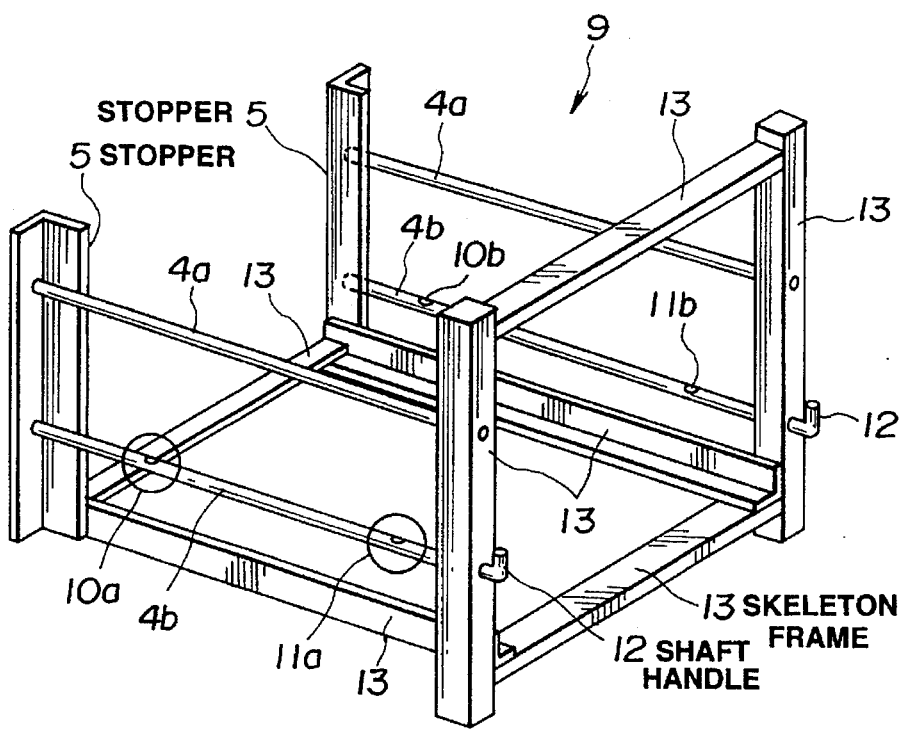
FIG. 2 is a view showing a rear cabinet when an optical unit box in FIG. 1 is removed.

FIG. 2 is a view showing the rear cabinet when the optical unit box is removed.

In FIG. 2, two right and left stoppers 5 forming the rear cabinet 9 are fitted with a total of four shafts 4a and 4b of respectively two and the two shafts 4b on the lower side are provided respectively with part grooves 10a, 10b, 11a and 11b. Handles 12 of the shafts for rotating the shafts are provided respectively at the ends on the sides opposed to the stoppers 5 of the two lower shafts 4b.

Figure 24:
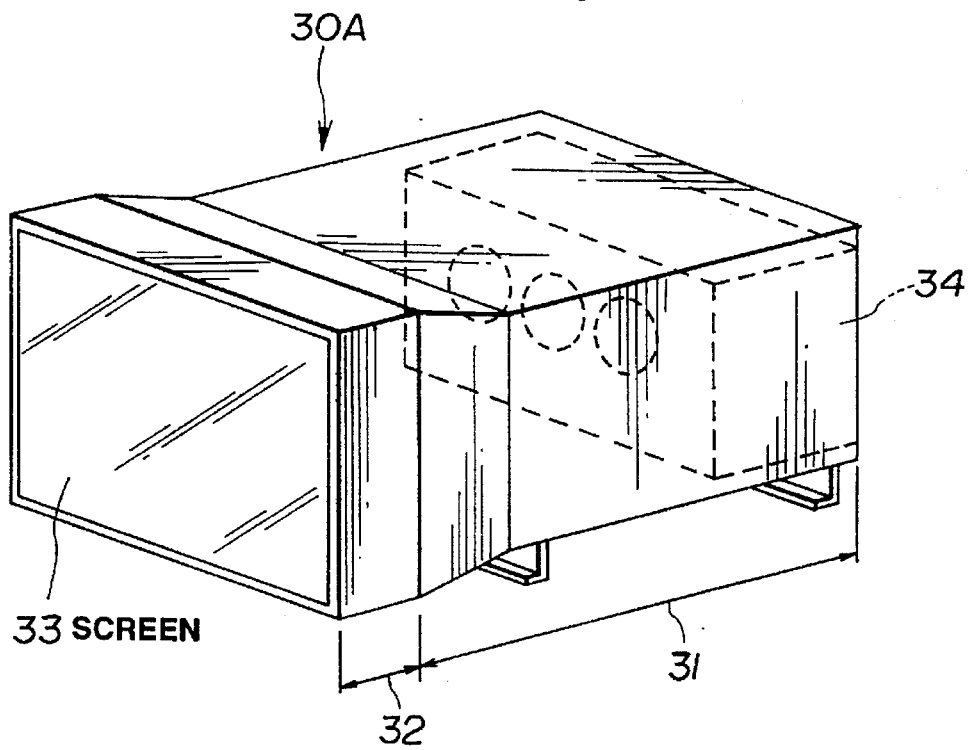
FIG. 24 is a perspective view showing a conventional PJ unit alone.
Figure 25:
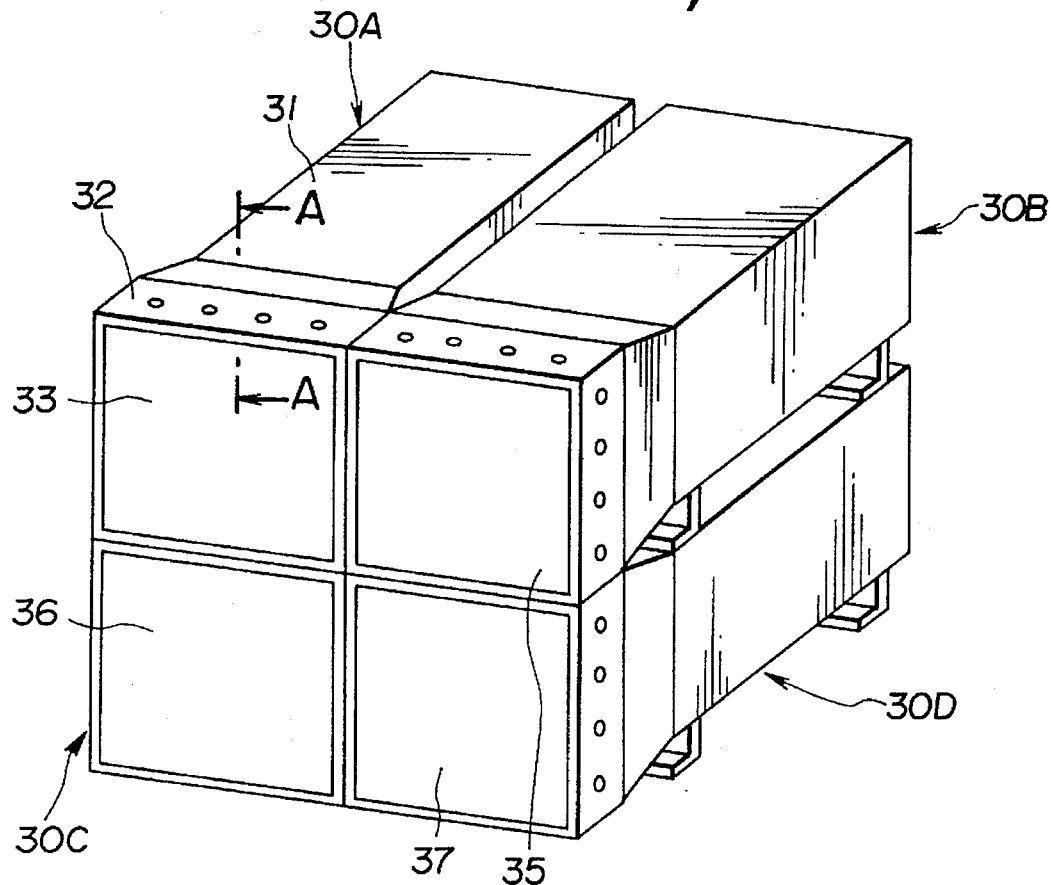
FIG. 25 is a perspective view showing the conventional PJ units as vertically and horizontally piled to form a multiscreen displaying apparatus.
Figure 26:
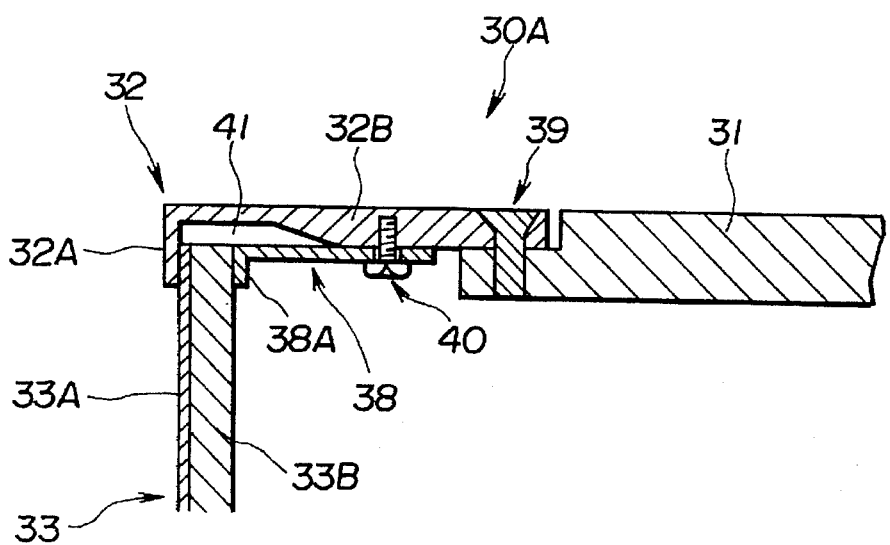
FIG. 26 is a sectioned view of the part shown by line A—A in FIG. 25.

As the rear cabinet 9 is basket-shaped (frame-shaped) as shown in FIG. 2, the optical unit box 3 will be exposed directly to the outer part. However, thereby, the rear cabinet 9 may be only of the weight of a skeleton frame 13, the increase of the weight by the double structures of the optical unit box 3 and the cover of the barrel 34 (See FIG. 24) can be prevented, substantially the weight of only the optical unit box 3 can be made and the weight can be reduced. Further, as the rear cabinet 9 has no cover, the optical unit box 3 cooling efficiency will be elevated and the maintenance of various components (parts) within the optical unit box 3 will be easy.

Figure 3:
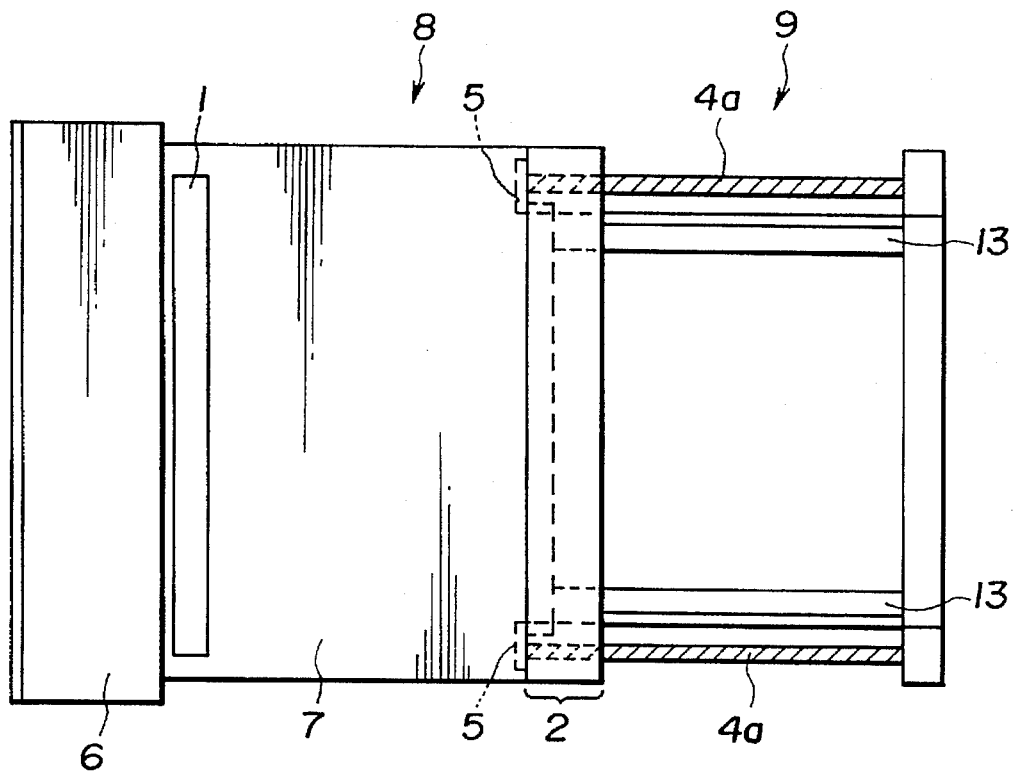
FIG. 3 is a view of the PJ unit in FIG. 1 as seen from above.

FIG. 3 is a view of a PJ unit as seen from above.

In FIG. 3, a horizontal beam 1 is fitted above the barrel 7 so that the screen fitting frame 6 of the adjacent PJ unit may not be hurt in piling up the later described PJ units or the like.

The structure of containing the rear cabinet 9 in the front cabinet 8, that is, the slidably containing structure in the present invention shall be explained by using FIG. 3 in the following. In this embodiment, four shafts 4a and 4b are provided on the left and right inside the skeleton frame 13 of the rear cabinet 9. The rear end part of the front cabinet 8 has the flange part 2 as described above and said four shafts 4a and 4b pass through this flange part 2 and will perform the role of a guide in the case of moving the rear cabinet 9 forward and rearward. In case the rear cabinet 9 is to be pulled out of the front cabinet 8, the pulled out length will be restricted by the stoppers 5 provided respectively at the ends on the front cabinet 8 side of said four shafts 4a and 4b. Thereby, the rear cabinet 9 will not be pulled out of the front cabinet 8 more than when the stoppers 5 are in contact with the flange part 2.

Within the range of the restricted values of the pulled out length restricted by the stoppers 5 provided respectively at the ends on the front cabinet 8 side of the four shafts 4a and 4b, slidable containing the rear cabinet 9 in the front cabinet 8 and pulling the rear cabinet 9 out of the front cabinet 8 can be smoothly made along the four shafts 4a and 4b.

When the PJ units are formed as in the above, in the case of transporting, storing and vertically and horizontally piling the PJ units, if the rear cabinet 9 of the PJ unit is slidably contained in the front cabinet 8, the greater part of the rear cabinet 9 will be slidably contained in the front cabinet 8, that is, the volume of the PJ unit will become substantially half, said operations will be able to be made in this state, therefore the space efficiency will become very high and the efficiency in the PJ unit piling (installing) operation and the like will be able to be greatly improved.

The structure for positively locking the sliding mechanism in the respective positions when the rear cabinet 9 of the PJ unit is fully pulled out of the front cabinet 8, that is, in the normal dimension position (also called the operating position) and when the rear cabinet 9 of the PJ unit is slidably contained in the front cabinet 8, that is, in the delivering state (also called the shipping position) shall be described in the following.

Figure 4A:
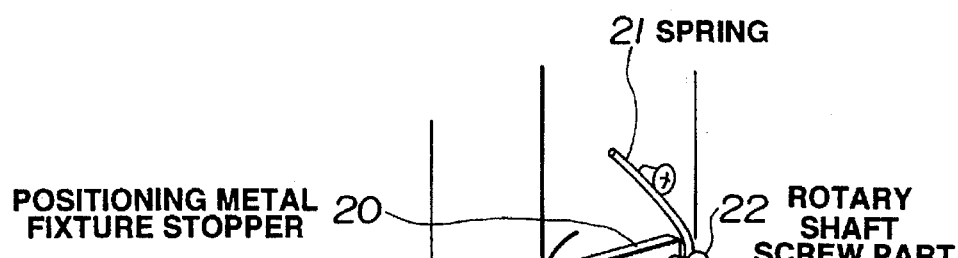
FIG. 4(a) is a view of a shaft as fixed to fix in an operating position or shipping position the rear cabinet of the PJ unit in FIG. 1.
Figure 4B:
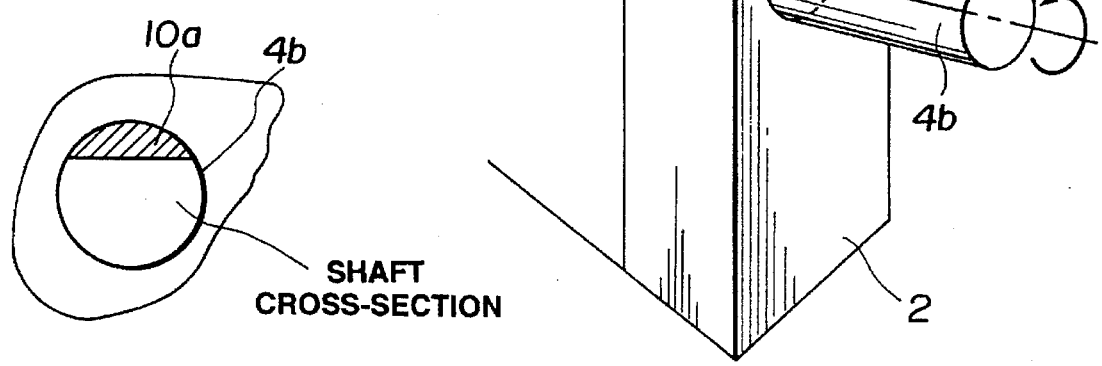
FIG. 4(b) is a view showing a cross-section in a part groove of the shaft in FIG. 4(a).

FIG. 4(a) is a view showing the shaft as fixed to fix the rear cabinet of the PJ unit in the operating position or shipping position. FIG. 4(b) is a view showing a cross-section of the shaft in FIG. 4 (a) and in a part groove.

As shown in FIG. 2, part grooves are provided respectively in two places (for the operating position and shipping position) on each shaft at least on the right and left. That is to say, as shown in FIG. 4(b), an incised groove (the part 10a shown by the hatching) is made in a part of the shaft 4.

By the way, as shown in FIG. 2, in this embodiment, part grooves 10a and 10b for positioning the operating positions and part grooves 11a and 11b for positioning the shipping positions are made on the two shafts 4b. The fixing method shall be explained in the following by taking the part groove 10a on the shaft 4b for example.

In FIG. 4(a), a positioning metal fixture stopper 20 is provided at the rear end of the flange part 2 of the front cabinet 8 so as to correspond to this part groove 10a. As shown in the same drawing, the positioning metal fixture stopper 20 is always pressed downward by a spring 21 with a rotary shaft screw part 22 as an axis. When the positioning metal fixture stopper 20 is fitted in the part groove 10a of this shaft 4b, the rear cabinet 9 will be locked.

To unlock it, the shaft 4b is rotated by the handle 12 of the shaft and the contact points of both are met in such position at which the surface having no groove and the positioning metal fixture stopper 20 contact each other. In this state, the shaft 4b will be slidably movable.

By such simple mechanism as in the above, the rear cabinet 9 can be easily fixed in an operating position or shipping position.

Now, said method of fixing the PJ unit in the operating position or shipping position by fitting the positioning metal fixture stopper 20 in the shaft 4b part groove 10a will be very effective in case the PJ unit is used as stationary. However, in the case of using the PJ unit in the operating position while moving, for example, as in a car-mounted multiscreen display, there will be a problem in respect of the fixed strength (stability). That is to say, there will be a problem that the operating position of the PJ unit will be varied (swung) by the vibration accompanying the movement. Therefore, a structure for generating no position lag of the operating position even in case the PJ unit is used while moving as described above, that is, for more positively and strongly locking the shaft 4b sliding mechanism shall be described in the following.

Figure 5A:
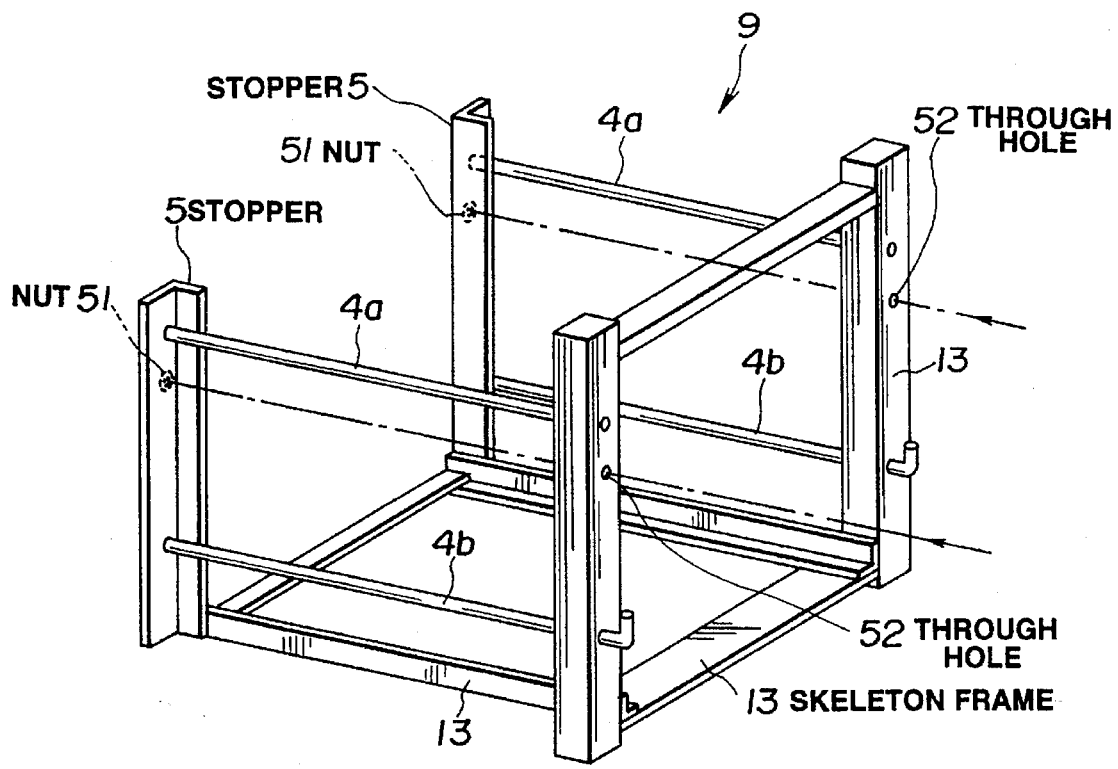
FIG. 5(a) is a perspective view showing the structure of the rear cabinet for more positively locking a PJ unit sliding mechanism by means of two shafts having bolts at the tips.
Figure 5B:
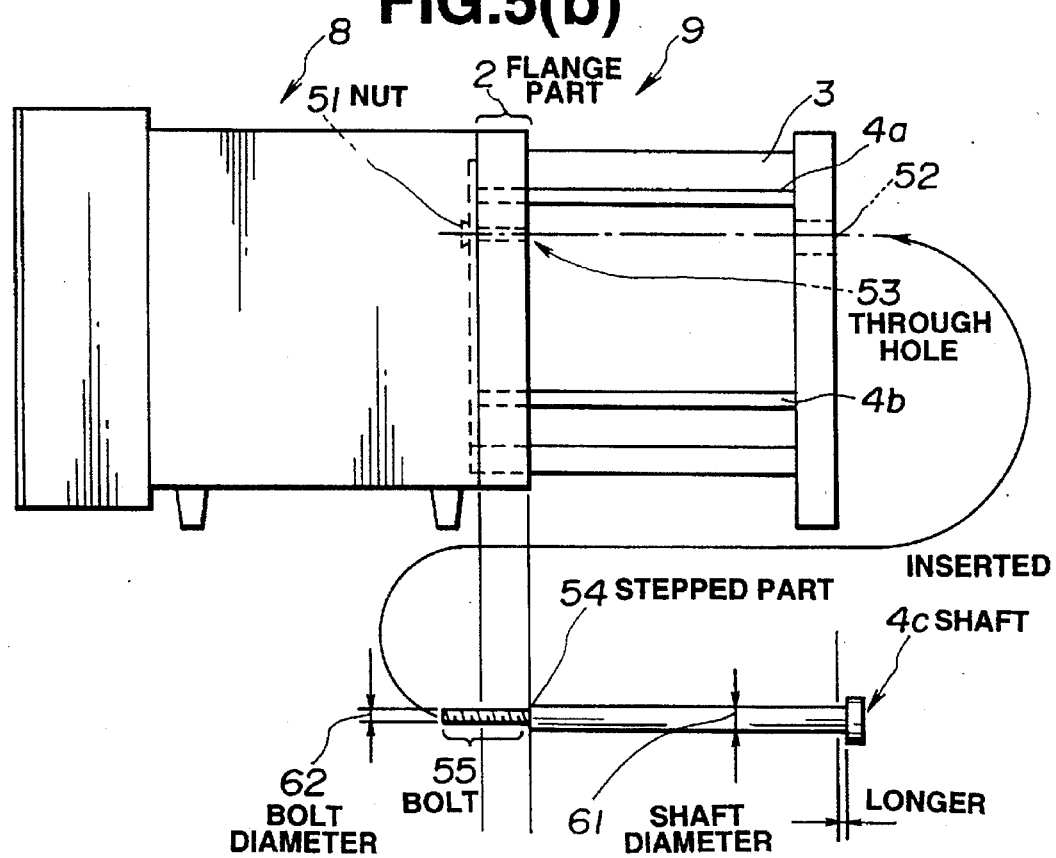
FIG. 5(b) is a side view showing the rear cabinet as connected to the front cabinet by means of shafts having bolts at the tips.

FIGS. 5(a) and (b) are views showing a structure for more positively locking the PJ unit sliding mechanism by two shafts having bolts at the tips. FIG. 5(a) is a perspective view showing the rear cabinet. FIG. 5(b) is a side view showing the rear cabinet as connected to the front cabinet.

In FIGS. 5(a) and (b), a nut 51 is provided near the shaft 4a on the stopper 5 of the rear cabinet 9 and a through hole 53 is provided in the flange part 2 of the front cabinet 8 so as to be parallel with this shaft 4a and to be coaxial with the nut 51. Also a through hole 52 is provided in the same manner in the stay at the rear end of the skeleton frame 13 so as to be parallel with this shaft 4a and to be coaxial with the nut 51. That is to say, the through hole 52 of the skeleton frame 13, the through hole 53 of the flange part 2 and the nut 51 on the stepper 5 are so formed as to be arranged on the same straight line and the shaft 4c is to be fitted so as to pass through them.

Here, the shaft 4c is somewhat longer than the shaft 4a and the tip is a bolt 55 so pitched as to be meshed with the nut 51. This bolt part is longer than the width of the flange part 2 and is provided at the root with a stepped part (thicker than the bolt diameter 62) 54.

The hole diameter of the through hole 53 of the flange part 2 is set to be larger than the bolt diameter 62 of the bolt 55 at the tip of the shaft 4c, the shaft diameter 61 of the shaft 4c is set to be larger than the hole diameter of the through hole 53 of the flange part 2 and the hole diameter of the through hole 52 of the skeleton frame 13 is set to be larger than the shaft diameter 61 of the shaft 4c.

In such formation as in the above, when the rear cabinet 9 is pulled out to the operating position, if the shaft 4c is passed through the through hole 52 of the skeleton frame 13 from the rear of the outside of the rear cabinet 9 and the bolt 55 at the tip of said shaft 4c is screwed and fitted into the nut 51 on the stopper 5 through the through hole 53 of the flange part 2, the rear surface of the flange part 2 and the stepped part 54 of the shaft 4c will be closely fitted to each other and will be screwed and fixed. Thereby, the stopper 5 will be strongly pressed and fixed inside the flange part 2 and, even in case the PJ unit is used while moving, the position lag of the operating position will be able to be prevented and the rear cabinet 9 will be secured in the stabilized position state.

In the above, the bolt 55 at the tip of the shaft 4c and the nut 51 on the stopper 5 are screwed and fixed to more positively and strongly lock the sliding mechanism of the shaft 4b. However, when a nut is provided at the tip of the shaft 4c, a bolt is provided on the stopper and both are screwed and fixed, the same effect will be obtained. The structure shall be described in the following.

Figure 6A:
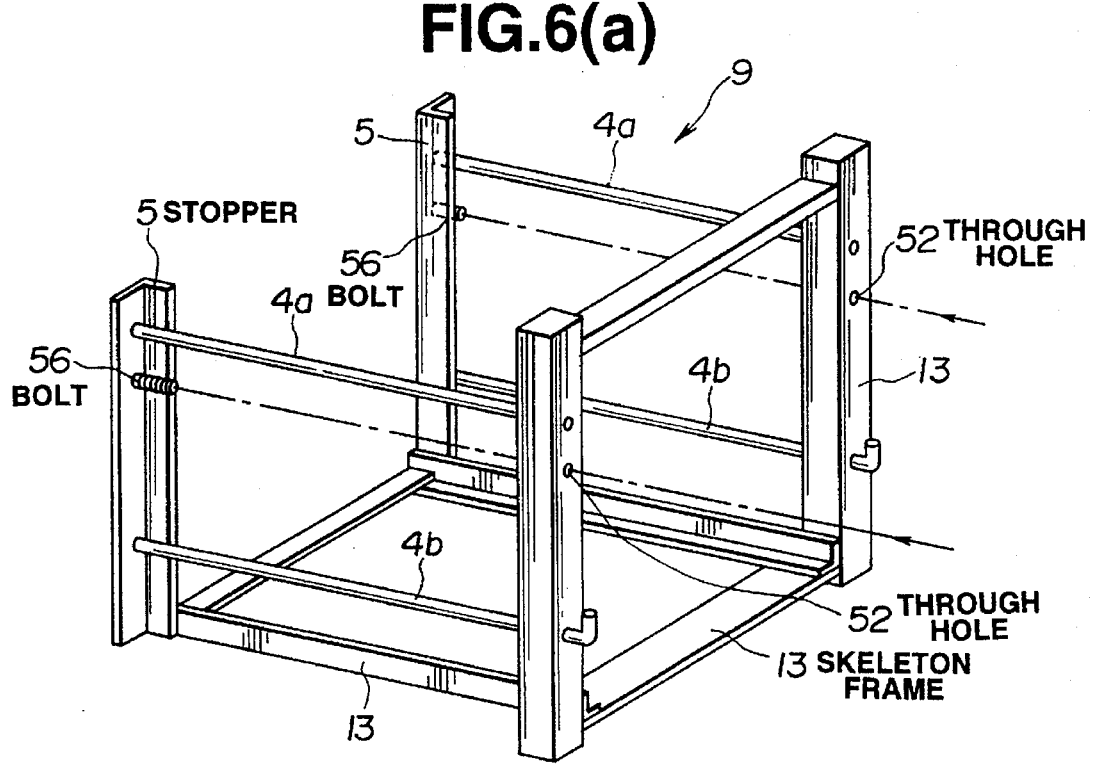
FIG. 6(a) is a perspective view showing the structure of the rear cabinet for more positively locking the PJ unit sliding mechanism by means of two shafts having nuts at the tips.
Figure 6B:
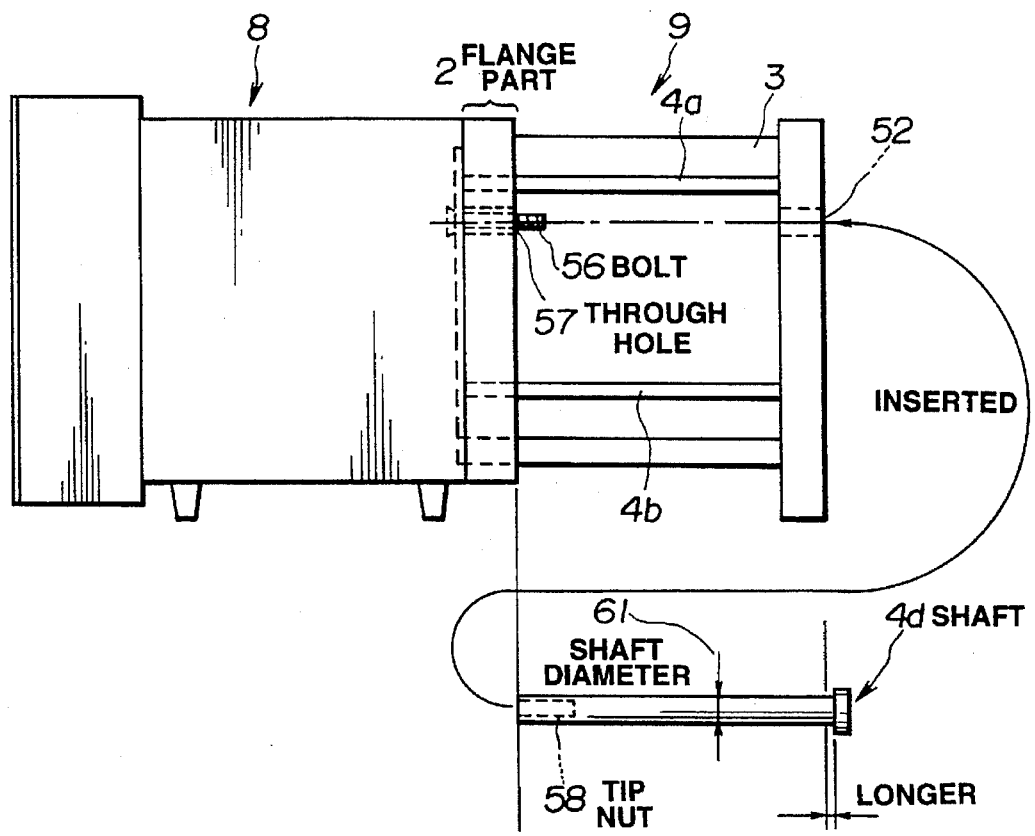
FIG. 6(b) is a side view showing the rear cabinet as connected to the front cabinet by means of shafts having nuts at the tips.

FIGS. 6(a) and (b) are views showing a structure for more positively locking the sliding mechanism of the PJ unit by two shafts having nuts at the tips. FIG. 6(a) is a perspective view showing the rear cabinet and FIG. 6(b) is a side view showing the rear cabinet as connected to the front cabinet.

In FIGS. 6(a) and (b), a bolt 56 is provided (fixed by welding or the like) near the shaft 4a on the stopper 5 of the rear cabinet 9. In the flange part 2 of the front cabinet 8, a through hole 57 is provided so as to be parallel with this shaft. 4a and to be coaxial with the bolt 56. Also, in a stay at the rear end of the skeleton frame 13, a through hole 52 is provided in the same manner so as to be parallel with the shaft 4a and to be coaxial with the bolt 56. That is to say, the through hole 52 of the skeleton frame 13, the through hole 57 of the flange part 2 and the bolt 56 on the stopper 5 are so formed as to be arranged on the same straight line and the shaft 4d is fitted to pass through or engage with them.

Here, the shaft 4d is somewhat longer than the shaft 4a and is provided at the tip with a tip nut 58 so pitched as to be meshed with the bolt 56.

Also, the hole diameter of the through hole 57 of the flange part 2 is set to be larger than the outside diameter of the bolt 56, the shaft diameter 61 of the shaft 4d is set to be larger than the hole diameter of the through hole 57 of the flange part 2 and the hole diameter of the through hole 52 of the skeleton frame 13 is set to be larger than the shaft diameter 61 of the shaft 4d.

In such formation as in the above, when the rear cabinet 9 is pulled out to the operating position, if the shaft 4d is passed through the through hole 52 of the skeleton frame 13 from the rear of the outside of the rear cabinet 9 and the tip nut 58 of said shaft 4d is screwed and fitted to the bolt 56 on the stopper 5, the rear surface of the flange part 2 and the tip part of the shaft 4d will be closely fitted together, screwed and fixed. Thereby, the stopper 5 will be strongly pressed and fixed to the inside of the flange part 2. Therefore, even in case the PJ unit is used while moving, the position lag of the operating position will be able to be prevented and the rear cabinet 9 will be secured in the stabilized position state.

Further, in this embodiment, even in case the shaft 4d is not used, in the operating position the bolt 56 on the stopper 5 will clog the greater part of the through hole 57 of the flange part 2 and will have an effect of preventing the light from outside from entering the barrel 7 and thereby the video displayed on the screen 33 will be able to be prevented from being deteriorated in the picture quality by the entry of the outside light.

Figure 7:
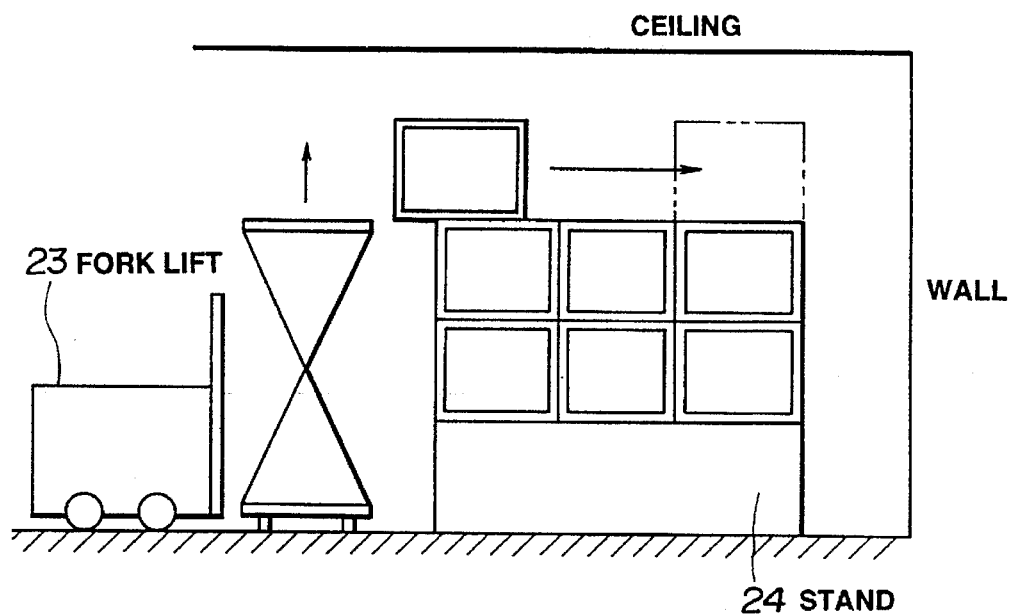
FIG. 7 is a view showing the PJ unit in FIG. 1 as slid and moved from one end to the other end to produce a large picture when the space within the room is limited.

FIG. 7 is a view showing that a large picture is made by sliding and moving the PJ units from one end to the other when the space within the room is limited. Concretely, a fork lift 23 is used for the operation of vertically and horizontally piling up the PJ units on a stand 24.

As shown in FIG. 7, when the space within the room is limited, in case a large picture is built with the PJ units, for example, the PJ units as fixed in the above described shipping position will have to be slid and moved from one end to the other to build a large picture with the PJ units. However, in case said PJ units are to be vertically and horizontally piled in such operating procedure (or an operating procedure close to it), the front surface end (corner) of the screen fitting frame 6 holding the screen 33 of the PJ unit will be hit by other adjacent PJ units and the other PJ units on the moving way and particularly the corner of the cabinet will be often hurt.

In this embodiment, in order to cope with such problems, as mentioned above (in FIG. 3), the horizontal beam 1 is provided at the upper end of the front cabinet 8 so as to project somewhat above the screen fitting frame 6 so that the corner of the cabinet may be prevented from being hurt when the PJ units are piled up vertically and horizontally.

Figure 8:
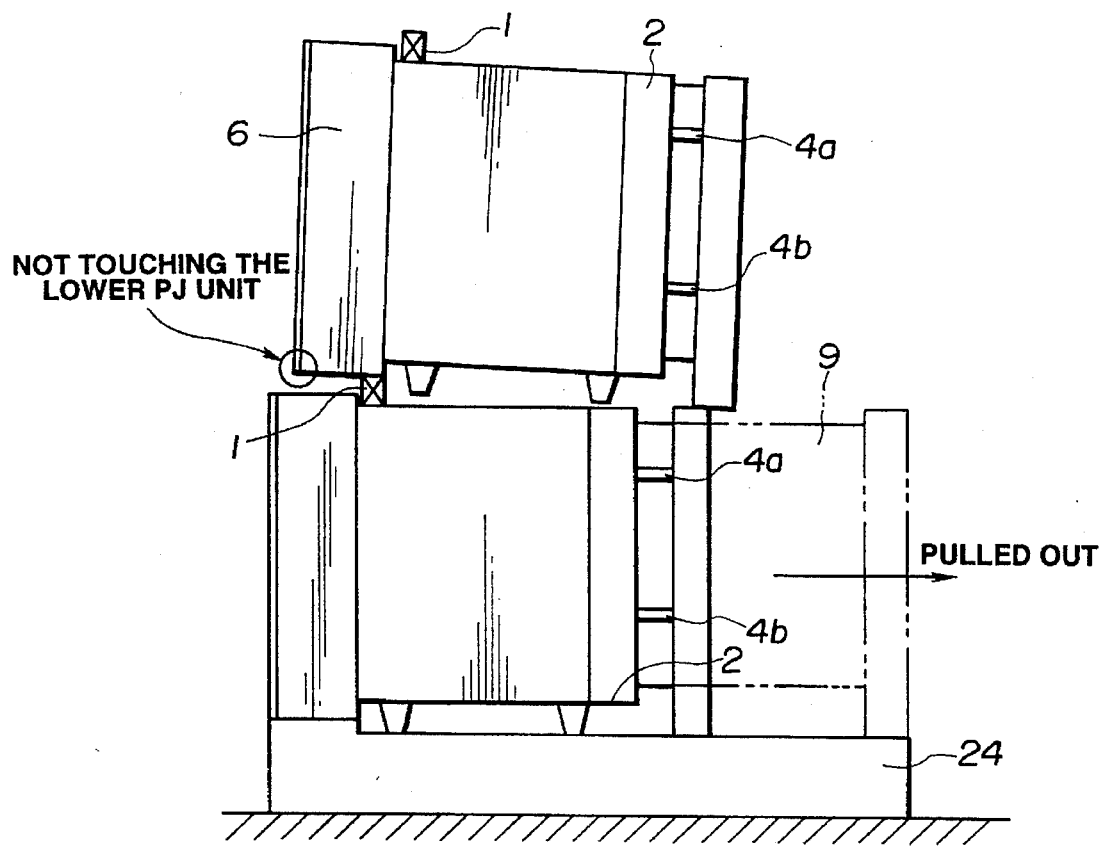
FIG. 8 is a view showing the PJ units in FIG. 1 as vertically and horizontally piled up.

FIG. 8 is a view showing that the PJ units are piled vertically and horizontally.

In FIG. 8, when the space is limited, that is, where the depth is only the width of the stand 24, when the PJ units are to be piled vertically and horizontally, the horizontal beam 1 of the PJ unit located below will perform the role of holding a fixed distance so that the screen fitting frames 6 may not contact each other while the PJ units located above are moving (being piled up) and will prevent the corner of the cabinet from being hurt. In this case, the rear cabinet 9 of the PJ unit located below may be located in either of the operating position and the shipping, position.

Figure 9A:
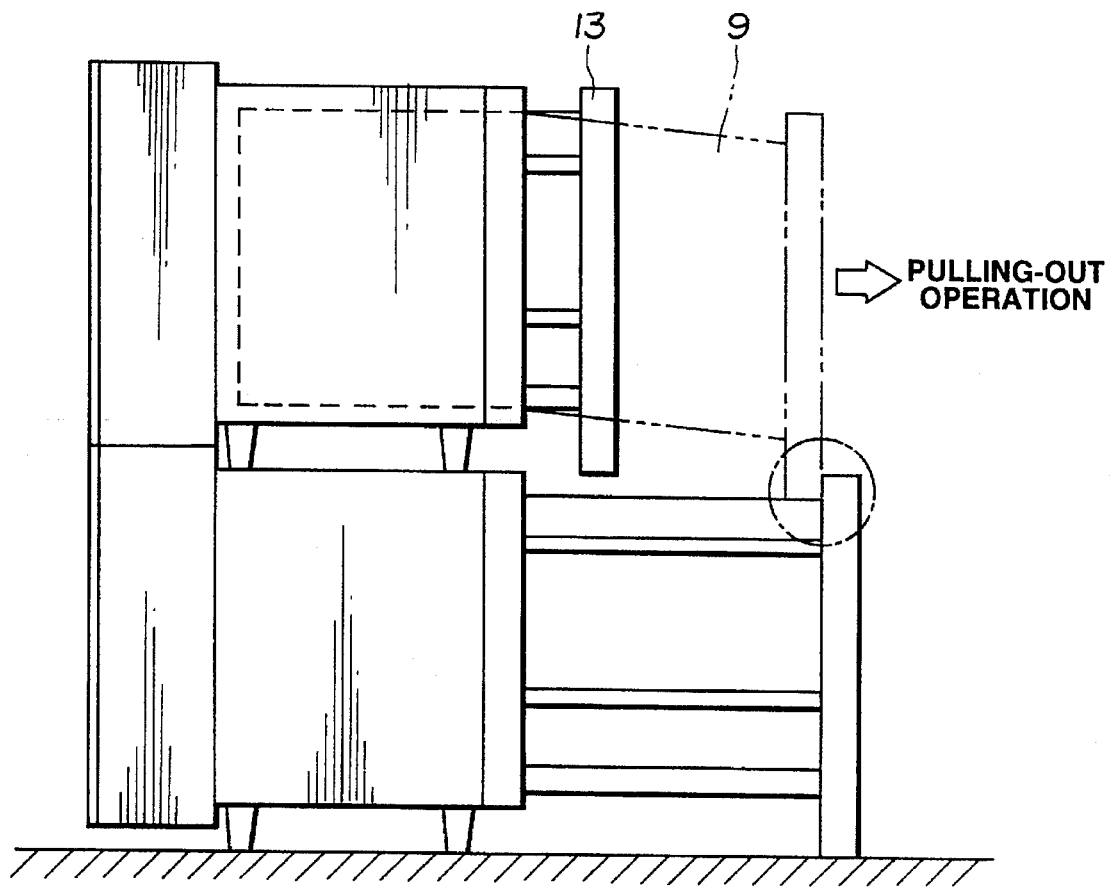
FIG. 9(a) is a side view of the PJ units in FIG. 1 piled up in the shipping position as converted to be in the operating position in the order from the lower step.

FIGS. 9(a), (b) and (c) are views for explaining the operation in which the PJ units piled up when the rear cabinet is fixed in the shipping position are changed in turn from the lower step to the operating position.

As shown in FIG. 9(a), in the respective PJ units of the multiscreen display made by piling up the PJ units as fixed in the shipping position, in case the rear cabinets 9 are pulled out (to be in the operating position) in turn from the lower step to the upper step except the PJ unit on the lowermost step, as the rear cabinet 9 is pulled out, the skeleton frame 13 will be bent downward by the weight (self-weight) of the rear cabinet 9. Therefore, as shown by the two-point chain lines in FIG. 9(a), the inside of the upper part of the stay at the rear end of the skeleton frame 13 on the lower step and the outside of the lower part of the stay at the rear end of the skeleton frame 13 on the upper step will contact with each other and the rear cabinet 9 on the upper step will not be able to be smoothly pulled out.

Figure 9B:
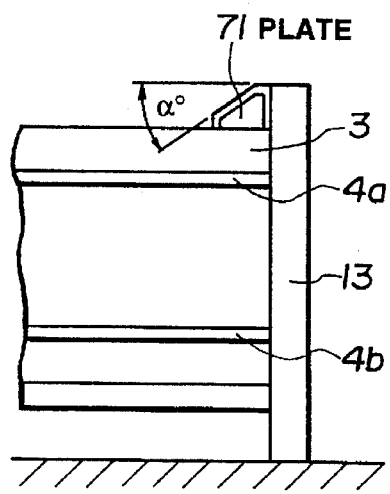
FIG. 9(b) is a partial side view of an arranged plate facilitating the rear cabinet pulling out operation.
Figure 9C:
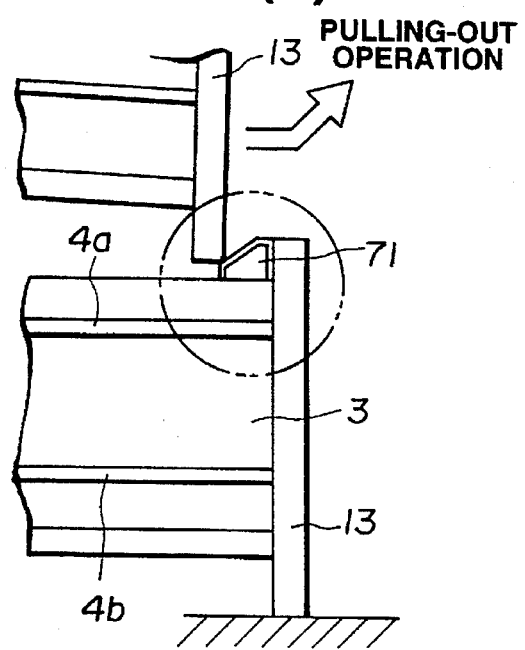
FIG. 9(c) is a partial side view for explaining the rear cabinet pulling out operation.

Therefore, as shown in FIG. 9(b), an operating plate 71 having a proper inclination angle $\alpha_0$ is provided on the front side of the upper part of the stay at the rear end of the skeleton frame 13. Thereby, as shown in FIG. 9(c), in case the rear cabinet 9 on the upper step is to be pulled out, even if the skeleton frame 13 is bent downward by the weight (self-weight) of said rear cabinet 9, the lower part of the stay at the rear end of the skeleton frame 13 on the upper step will be lifted along the inclined surface of a plate 71 provided on the front side of the upper part of the stay at the rear end of the skeleton frame 13, the inside of the upper part of the stay at the rear end of the skeleton frame 13 on the lower step and the outside of the lower part of the stay at the rear end of the skeleton frame 13 on the upper step will no longer contact with each other and the rear cabinet 9 on the upper step will be able to be smoothly pulled out.

According to the embodiments of the invention explained in said FIGS. 1 to 9, there are the following effects.

First, as the rear cabinet is basket-shaped (frame-shaped) and the inside optical unit box is exposed directly to the outside, the entire PJ unit will be able to be made light in the weight.

Second, as the PJ unit is divided, two of the operating position and shipping position will be able to be selected, the total length of the PJ unit will be able to be selected in response to the respective states in the transportation, storing and installing and a favorable operability will be able to be obtained.

Third, the shaft of the rear cabinet of the PJ unit will perform a containing operation guiding role in case the rear cabinet is to be contained in the front cabinet and said operating position or shipping position will be able to be easily selected by the part groove and positioning stopper provided on said shaft and the taking in and out operation will be easy.

Fourth, as the rear cabinet can be fixed strongly and without a gap to the front cabinet by means of the shaft having a bolt or nut at the tip, even in case the PJ unit is used while moving, the video will be able to be prevented from being deteriorated by the position lag of the operating position and the picture quality of the PJ unit will be able to be prevented from being deteriorated by the incidence of the outside light.

Fifth, by the horizontal beam fitted to the upper part of the front cabinet barrel, even within a limited narrow space, plural PJ units will be able to be be easily piled up. Particularly, as the PJ unit can be simply moved in the horizontal direction, in such case, by said horizontal beam, the cabinet corner will be able to be prevented from being hurt and the operability will improve. Also, the piling operation in the shipping position will be possible and the handling will be very easy.

Sixth, in case the rear cabinet is to be pulled out, even if said rear cabinet is bent downward by the self-weight, when the lower surface of the stay on the upper step is lifted along the inclined surface of the operating plate, the bending will be corrected and therefore the rear cabinet on the upper step will be able to be smoothly pulled out.

Figure 10:
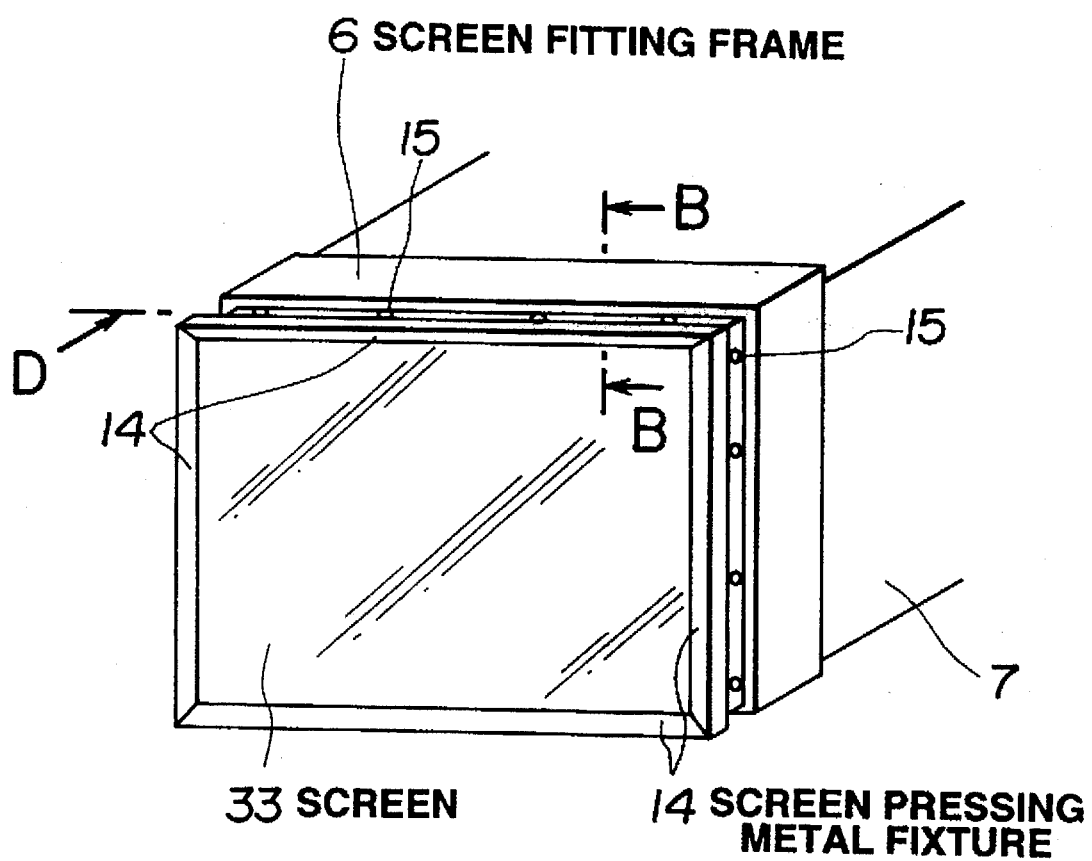
FIG. 10 is a perspective view showing the screen fitting structure of the PJ unit in the multiscreen displaying apparatus according to the present invention.

FIG. 10 shows an embodiment of the screen fitting structure in the PJ unit in FIG. 1.

As shown in FIG. 10, the screen fitting frame 6 is arranged at the front end of the barrel 7 of the front cabinet 8. The screen 33 on which a video is magnified and projected by the optical unit box within the rear cabinet 9 is fitted to the screen fitting frame 6 and is held by the screen pressing metal fixtures 14 forming the first holding means and the screen fitting frame 6 forming the second holding means. This screen fitting frame 6 is integrally provided in the barrel 7. The screen 33 is held by the screen pressing metal fixtures 14 arranged to enclose the screen fitting frame 6 and screen 33. The screen pressing metal fixtures 14 are arranged respectively on the four end sides of the screen fitting frame 6 and are fixed to the screen fitting frame 6 by plural screws 15.

The cross-section on line B—B in this FIG. 10 is shown in FIG. 11(a) to explain the screen fitting structure. By the way, FIG. 11(b) is a view showing the screen pressing metal fixture 14 fixing part in FIG. 11(a) as magnified. FIG. 11(c) is a view of FIG. 11(b) as seen from above. FIG. 11(d) is a view in case the screen part is moved. FIG. 11(e) is a view showing the shape of the male screw. FIG. 11(f) is a view showing a locking structure in the vicinity of a hole of the screen pressing metal fixture as seen from above. FIG. 11(g) is a sectioned view on line C—C in FIG. 11(f).

In FIG. 11(a), the screen 33 consists of a Fresnel part 33B and lenticular part 33A and the screen pressing metal fixtures 14 are provided to enclose this screen 33.

Each screen pressing metal fixture 14 is formed of a thin metal (for example, stainless steel) plate-like member and is bent at one end to the screen surface. The screen 13 is to be locked by these bent parts (locking parts) 14C. Also, each screen pressing metal fixture 14 is bent at the other end to substantially rectangularly intersect the surface including the outer periphery at a distance of a predetermined dimension and is further bent to be substantially parallel with the surface including the outer periphery at a distance of a predetermined dimension. A hole 14E for fixing this screen pressing metal fixture 14 is provided in the part 14D bent to be substantially parallel with the outer periphery, is substantially elliptic and is so provided that the major axis of the ellipse may come toward the screen 33 (See FIG. 11(c)). Also, a plurality of the holes 14E are provided on the outer periphery. Also, as shown in FIGS. 11(f) and 11(g), a projecting part 14W of such predetermined height H that the bottom surface of the head of the male screw 15 can contact is provided in a part positioned near the hole 14E of the screen pressing metal fixture 14 and on the screen side of the hole 14E. As shown in FIG. 11(g), the height H including that of this projecting part 14W is set to be somewhat higher than the height h of the step part 15A not threaded for the male screw 15 (h<H). Therefore, as shown in FIGS. 11(a) to (c), when the screen is fixed, the head of the male screw 15 will contact and press the projecting part 14W near the hole 14E and will function to fix the screen pressing metal fixture 14.

On the other hand, a screen fitting frame 6 holding these screen pressing metal fixtures 14 and having a receiving part 6A holding the screen 33 as paired with said locking part 14C is arranged on the screen back surface side, is formed integrally with the barrel 7 and has an outer periphery of substantially the same shape as of the barrel 7 larger than the outer periphery of the screen 33. The receiving part 6A is provided at the end on the screen side of this screen fitting frame 6 and is provided so that the outer peripheral edge of the screen fitting frame 6 may be positioned within the surface including the outer periphery of the screen 33. Therefore, a gap will be made between the adjacent units on the screen 33 end surface side of the screen fitting frame 6. The thin plate-like screen pressing metal fixture 14 is arranged in the part provided with this gap. When the sum of the two plate thicknesses of these screen pressing metal fixtures 14 is set to be smaller than the gap between the adjacent units, even after the screen pressing metal fixtures 14 are arranged, a space part 17 (See FIG. 12) will be provided between the screen pressing metal fixtures.

In the screen fitting frame 6, a recess 6B is provided at a distance of a predetermined dimension from the receiving part 6A. Here, the bent part 14D of the screen pressing metal fixture 14 and the bottom surface of the recess 6B contact with each other. In this bottom, a female screw 6C is cut at a distance of a predetermined dimension k from the end surface of the recess 6B so as to be screwed with a male screw 15 inserted through the hole 14E of the screen pressing metal fixture 14. The height of the recess 6B from the bottom surface is so set that, even after the male screw 15 is screwed in, the head of this male screw 15 will not influence the screen pressing metal fixture 14 of the adjacent PJ unit.

On the other hand, as shown in FIG. 11(e), this male screw 15 is provided with a columnar stepped part 15A of a height h in which no screw is cut on the side below the head of the screw 15. As shown in FIG. 11(b), after this male screw 15 is screwed into the female screw 6C of the screen fitting frame 6, this stepped part 15A will project out of the bottom surface of a recess 6B provided in the screen fitting frame 6 and will be inserted through the hole part 14E of the screen pressing metal fixture 14. The height h of this stepped part 15A is provided to be rather larger than the plate thickness d of the screen pressing metal fixture 14 and the length in the minor axis direction of the substantially elliptic hole 14E is provided to be rather larger than the diameter of the stepped part 15A. Therefore, with the stepped part 15A as an axis, along the major axis of the substantially elliptic hole 14E, the screen pressing metal fixtures 14 and screen can be slid and moved. The fixing means is formed of these male screws 15 and elliptic holes 14E. Also, as described above, as shown in FIGS. 11(f) and 11(g), the projecting part 14W of such predetermined height H that the bottom surface of the head of the male screw 15 can contact is provided in the part positioned near the hole 14E of the screen pressing metal fixture 14 and on the screen side of the hole 14E. Therefore, as shown in FIGS. 11(a) to (c), when the screen is fixed, the head of the male screw 15 will contact and press the projecting part 14W near the hole 14E, will positively fix the screen pressing metal fixture 14 and will positively hold the screen 33.

Thus, except when the screen is fitted and replaced, the screen 33 will be able to be held by the screen pressing metal fixtures 14 and the screen fitting frame 6 receiving parts 6A and, in case the screen 33 is to be removed, the screen and screen pressing metal fixtures 14 will be able to be moved in the screen direction along the holes 14E with the stepped part 15A of the male screw 15 as an axis (See FIG. 11(d)).

By the way, the above explanation has been made with the vertical section on line B—B in FIG. 10. However, the explanation is also the same on the horizontal section.

The operation in FIG. 10 shall be explained in the following by using FIG. 12.

Figure 12:
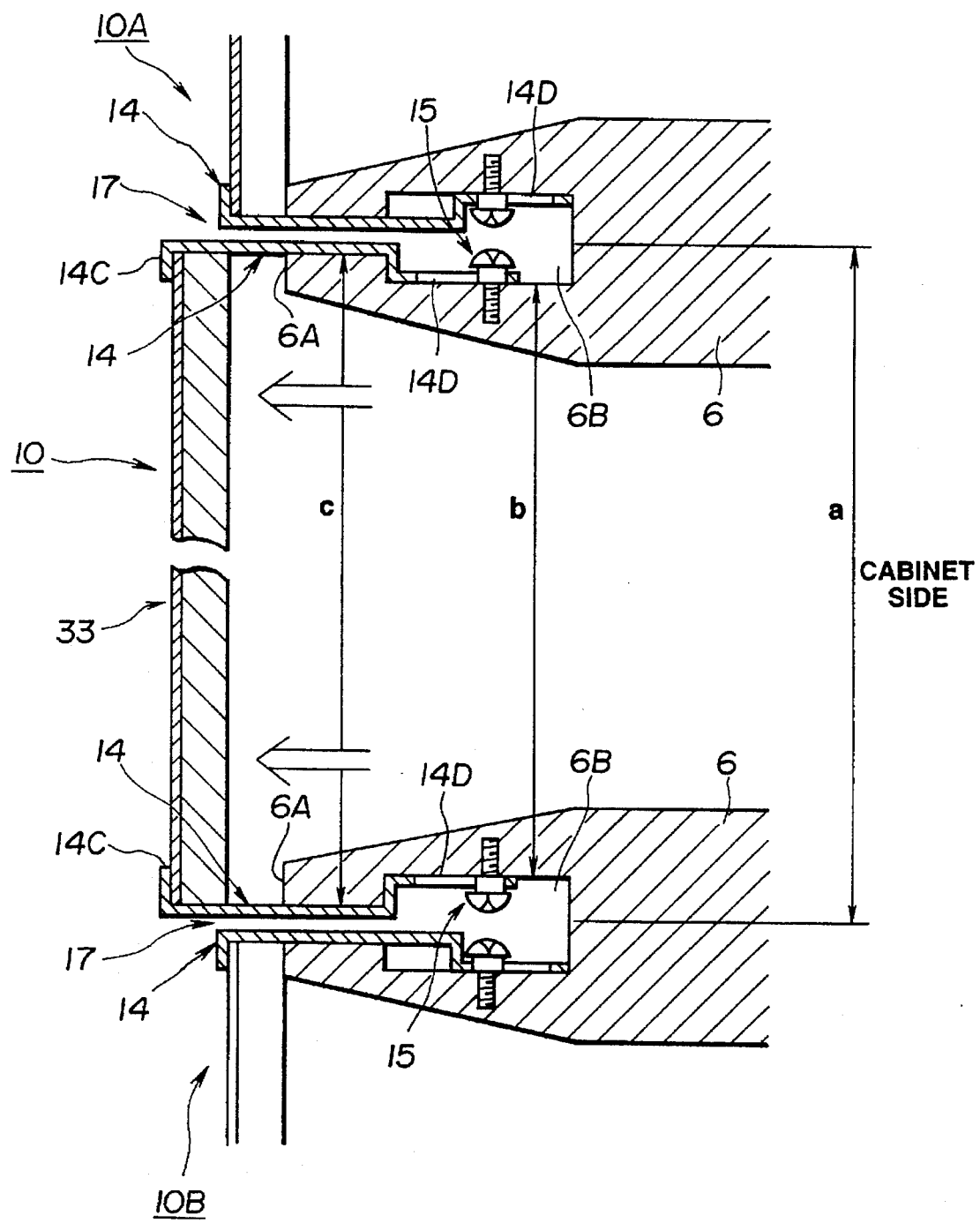
FIG. 12 is a sectioned view of the PJ units in FIG. 10 as piled up when the screen is forward pushed out.

FIG. 12 is a sectioned view of a multiscreen display in which plural PJ units 10, 10A and 10B are piled up.

As shown in FIG. 12, as the screen fitting frame 6 is set so that the outer periphery of the barrel 7 side may be larger than that of the screen 33 side (that is to say, a>c between the contour dimensions a and c shown in FIG. 12), a gap (a−c) will be made on the screen side between the adjacent units 10 and 10A, or 10 and 10B. Further, as the sum (2×d) of the plate thicknesses of the respective screen pressing metal fixtures 14 arranged on the adjacent units 10 and 10A, or 10 and 10B is set to be smaller than a gap 2×(a−c), not only the screen pressing metal fixtures 14 themselves will be able to be formed not to contact with each other but also the space part 17 will be able to be further provided between the adjacent screen pressing metal fixtures 14. Therefore, the screen pressing metal fixture 14 will be able to be moved along the substantially elliptic hole 14E and only the screen part 33 will be able to be smoothly moved. Also, as the screen pressing metal fixture 14 is made of a thin metal and is therefore elastic, not only, when the screen pressing metal fixture 14 is opened outside, the screen 33 will be able to be easily taken out but also, after the screen is removed, the screen pressing metal fixture 14 will be recovered and will return to the original position so as to be able to be fitted or removed at any time. Further, as the space part 17 is provided, the influence of the elongation and shrinkage by the temperature or humidity of the screen 33 will be able to be absorbed. Also, as shown in FIGS. 11(f) and 11(g), the projecting part 14W of such predetermined height H that the bottom surface of the head of the male screw 15 can contact is provided near the substantially elliptic hole 14E of the screen pressing metal fixture 14 and on the screen side of the hole 14E. Therefore, in case the screen pressing metal fixture 14 is to be pressed by the male screw 15, by this projecting part 14W, a partly strong fastening force will be able to be given and the screen 33 will be able to be more positively held.

An embodiment made by further improving the embodiment in FIG. 10 is shown in FIG. 13.

In this embodiment, the operability will be improved by using a screw for regulating the screen horizontally fitting position. FIG. 13 is a sectioned view at D in FIG. 10.

As shown in FIG. 13, only the central screw is a screw 18 having a head diameter of substantially the same dimension as of the length in the minor axis direction of the substantially elliptic hole 14E and movably fixing the screen metal fixture 14. The other screw is formed of a screw 15 having a stepped part 15A.

The operation in FIG. 13 shall be explained.

Figure 13A:
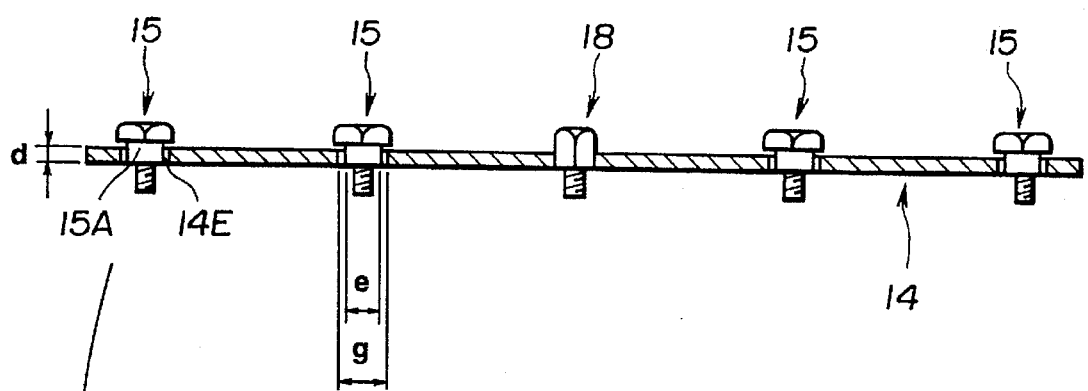
FIG. 13(a) is a sectioned view of the part shown by D in FIG. 10.
Figure 13B:
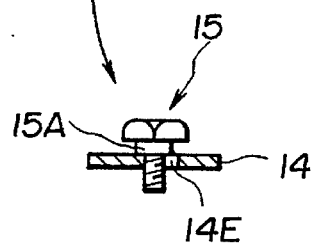
FIG. 13(b) is a sectioned view showing a fault producing a horizontal lag between the hole of the screen pressing metal fixture and the screw.

As shown in FIG. 13(a), in fitting, as there is a difference (play: g−e) between the length g in the minor axis direction of the hole 14E and the diameter e of the screw stepped part 15A, there has been a horizontal lag (See FIG. 13(b)). However, in said formation, as the central screw 18 performs a positioning function and regulates the horizontal position, the replacing operation will be easier.

Figure 14A:
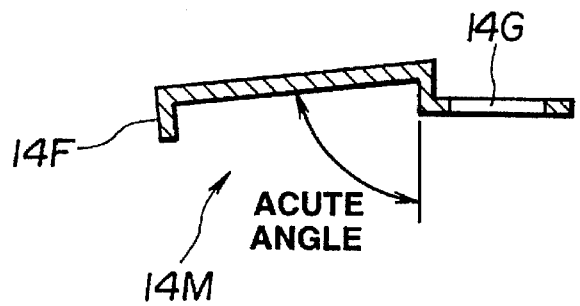
FIG. 14(a) is a sectioned view showing the screen pressing metal fixture in FIG. 10 and others.
Figure 14B:
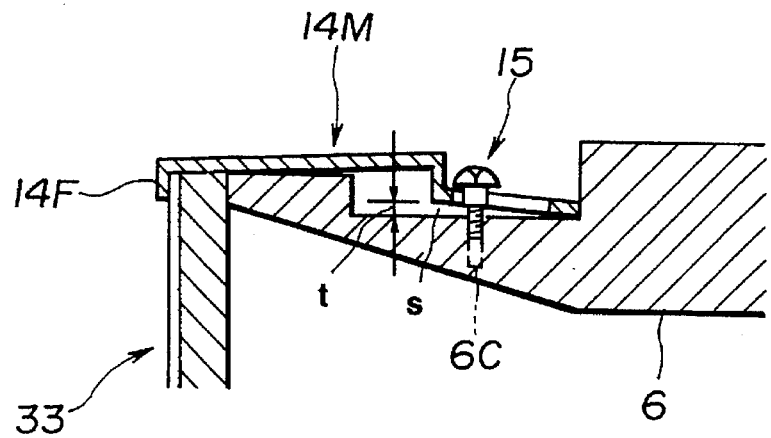
FIG. 14(b) is a sectioned view showing the screen pressing metal fixture in FIG. 14(a) before it is fastened to the screen fitting frame with screws.
Figure 15:
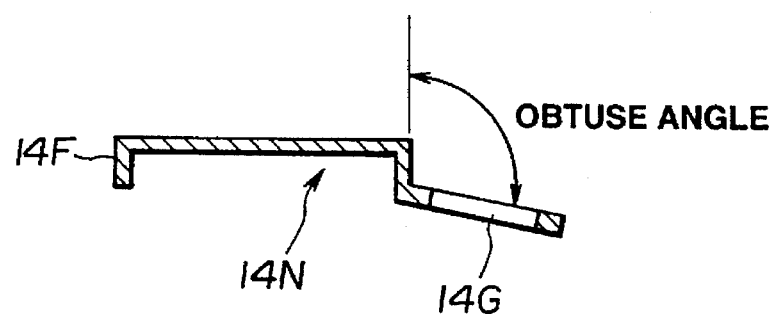
FIG. 15 is a sectioned view showing the screen pressing metal fixture in FIG. 10 and others.

In the same manner, the other embodiment is shown in FIGS. 14 and 15.

As shown in FIG. 14, the screen pressing metal fixture 14 shown in FIG. 11 is improved. FIG. 14(a) is a sectioned side view of the improved screen pressing metal fixture. FIG. 14(b) is a view showing the screen pressing metal fixture shown in FIG. 14(a) before being fastened to the screen fitting frame 6 with the screw 15.

As shown in FIG. 14(b), the screen pressing metal fixture 14M is provided with a locking part 14F for locking the screen 33 by bending the fixture at one end to the surface side of the screen 33. This screen pressing metal fixture 14M is bent at the other end through a predetermined dimension and by an acute angle with the surface including the outer periphery and is further bent through a predetermined dimension from this bent part so as to be smaller than the outer periphery and to substantially rectangularly intersect this bent part. This bent part is provided with a substantially elliptic hole 14G. By the way, the same as the screen pressing metal fixture 14 in FIG. 11, this screen pressing metal fixture 14M is also formed of a thin plate metal. Such screen pressing metal fixtures are arranged on the respective end sides to hold the screen 33 so as to be enclosed. As this screen pressing metal fixture 14M is bent to be of an acute angle, as shown in FIG. 14(b), before it is fastened, a gap part s will be made at the screen side end of the hole 14G and will be a spring back which will be eliminated when the screen pressing metal fixture is fastened and fixed. By the way, this gap part is set so that the length t of the gap made between the screen side end of the hole 14G of this screen pressing metal fixture 14M and the screen fitting frame 6 may be larger than the difference between the height h of the stepped part 15A of the screw 15 and the plate thickness d of the screen pressing metal fixture 14 and a fastening space may be provided.

FIG. 15 is a side sectioned view of a modification of the screen pressing metal fixture in FIG. 14.

As shown in FIG. 15, this screen pressing metal fixture 14N is bent so as to substantially rectangularly intersect the surface including the outer periphery and is further bent so as to have an angle (obtuse angle) larger than the rectangle in this bent part. Such screen pressing metal fixtures 14N are arranged on the respective end sides of the screen 33 to fix the screen 33. The same as in the screen pressing metal fixture 14M in FIG. 14(a), this screen pressing metal fixture 14N is fixed so that a gap part will be obtained before the male screw 15 is fastened but will be eliminated after it is fastened.

The operation in FIGS. 14(a) and 15 will be explained.

As shown in FIG. 14(b), before the screw 15 is fastened, the gap part s between the screen pressing metal fixture 14 and the screen fitting frame 6 will be able to be provided only at the end on the screen 33 side of the hole 14G. As this gap part s acts as a spring back, the screen 33 will be able to be more positively locked because, as the same effect as of a spring washer is obtained, the fastening force will become larger and the screw will be able to be more positively fastened. Therefore, thereby, with the locking part 14F, a larger force will be able to be applied in the direction of the back surface of the screen 33. Also, in case some force is applied to the PJ unit from the back surface side of the screen to push out the screen 33 part together with the screen pressing metal fixture 14M, a spring force (resilient force) will act on the screen pressing metal fixture 14M and therefore it will be able to be smoothly pushed out while being slid until the stepped part 15A of the screw and one end of the hole 14G dash against each other. In case the screen 33 is pushed out, after the stepped part 15A of the screw 15 and the end (right side end in the illustration) of the hole 14G completely dash against each other, the spring back function will be eliminated and they will be able to be easily removed outside.

Thus, if the screen pressing metal fixture in FIGS. 14(a) and 15 is used, when the PJ units are piled up, the screen will be able to be positively fixed by the spring back function and, when the screen is replaced, this spring back function will be eliminated and the screen will be able to be easily removed.

An example of the operation procedure of removing and replacing the screen shall be explained with reference to FIGS. 16 to 19 in the following.

Figure 16:
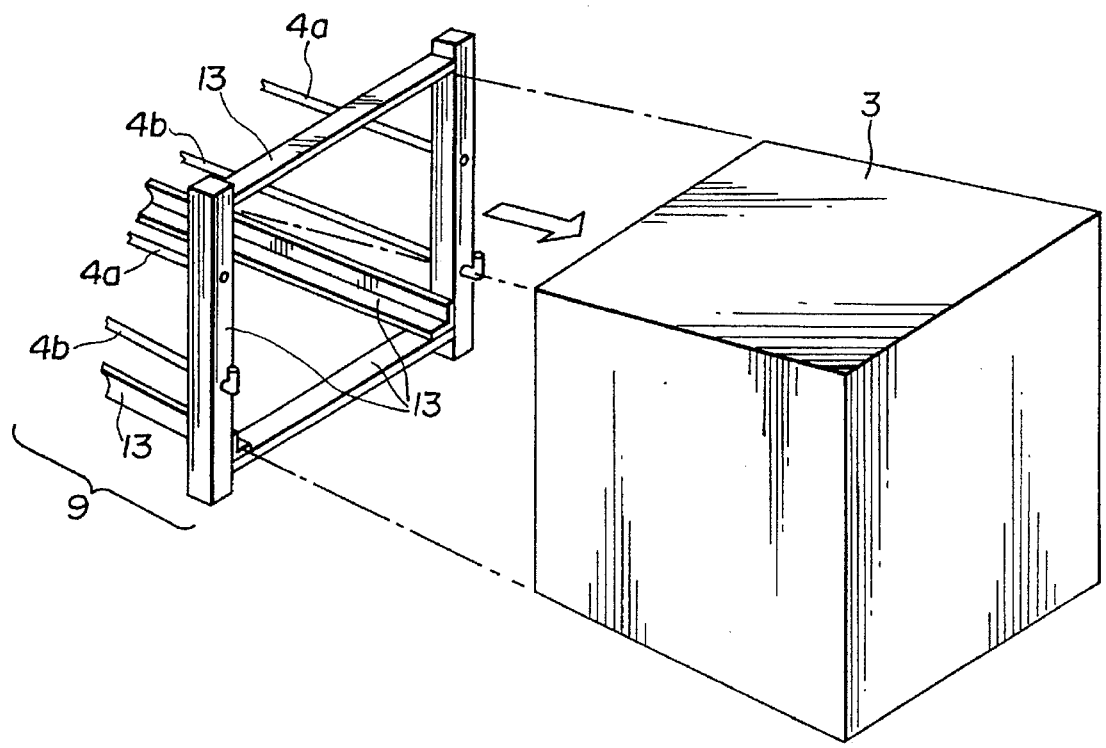
FIGS. 16 to 19 are perspective views for explaining an example of the screen removing and replacing operation procedure.

As shown in FIG. 16, the optical unit box 3 fixed and contained within the rear cabinet 9 is made slidable by releasing the locking means, is then slid and pulled out rearward along the rail-like skeleton frame 13 on the lower step and is removed out of the rear cabinet 9.

Figure 17:
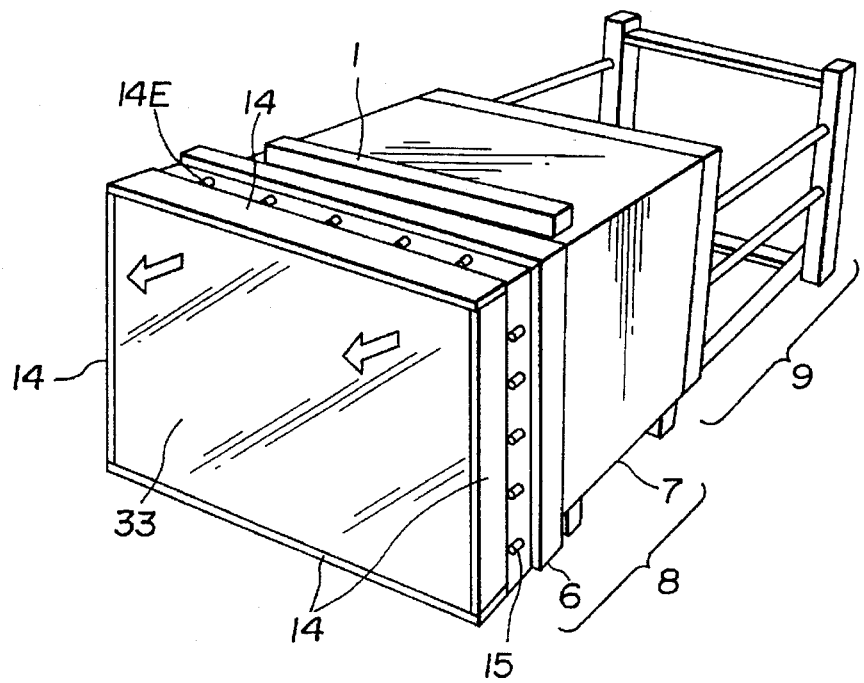

Then, as shown in FIG. 17, the upper part on the back surface side of the screen 33 is pushed from within the front cabinet 8 and the screen 33 and the upper, right and left screen pressing metal fixtures 14 are pushed out forward.

Figure 18:
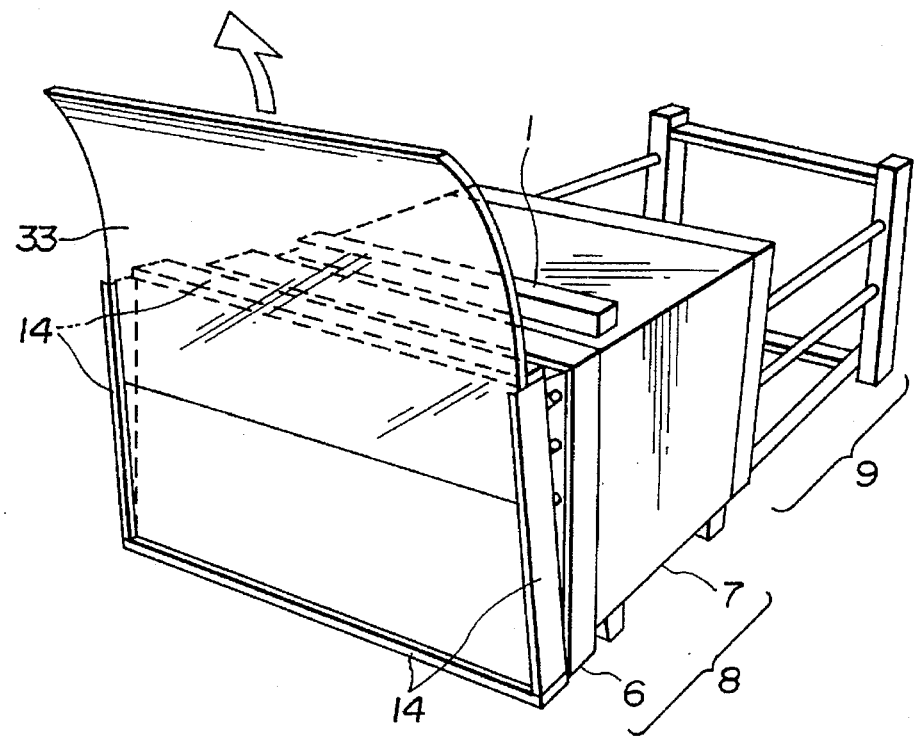

Then, as shown in FIG. 18, the upper screen pressing metal fixture 14 is bent and slightly transformed and the screen 33 is thereby removed from the upper screen pressing metal fixture 14, is then pulled out upward and is removed.

Figure 19:
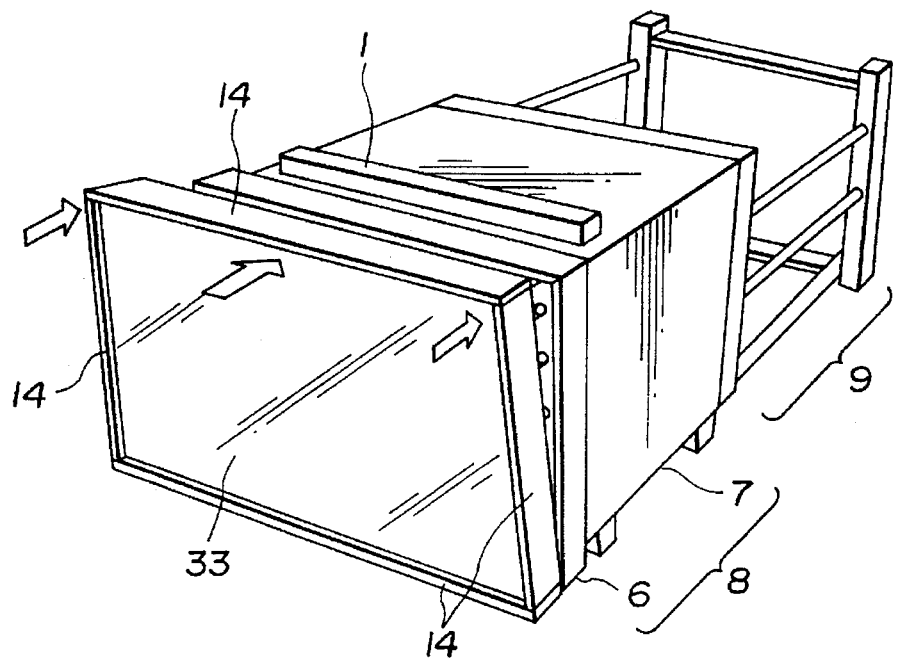

Then, a new screen 33 is fitted. The upper screen pressing metal fixture 14 is slightly (by about 7 to 10 mm) pushed rearward and the new screen 33 is put inside the right and left screen pressing metal fixtures 14 and is inserted until the screen pressing metal fixture 14 in the bottom is reached. Then, as shown in FIG. 19, the screen pressing metal fixture 14 is slightly transformed and the upper screen pressing metal fixture 14 is again hung on the upper part of the screen 33. Then, the upper, right and left screen pressing metal fixtures 14 are pushed in together with the screen 33 rearward from the front surface side to complete fitting the screen 33.

Figure 20A:
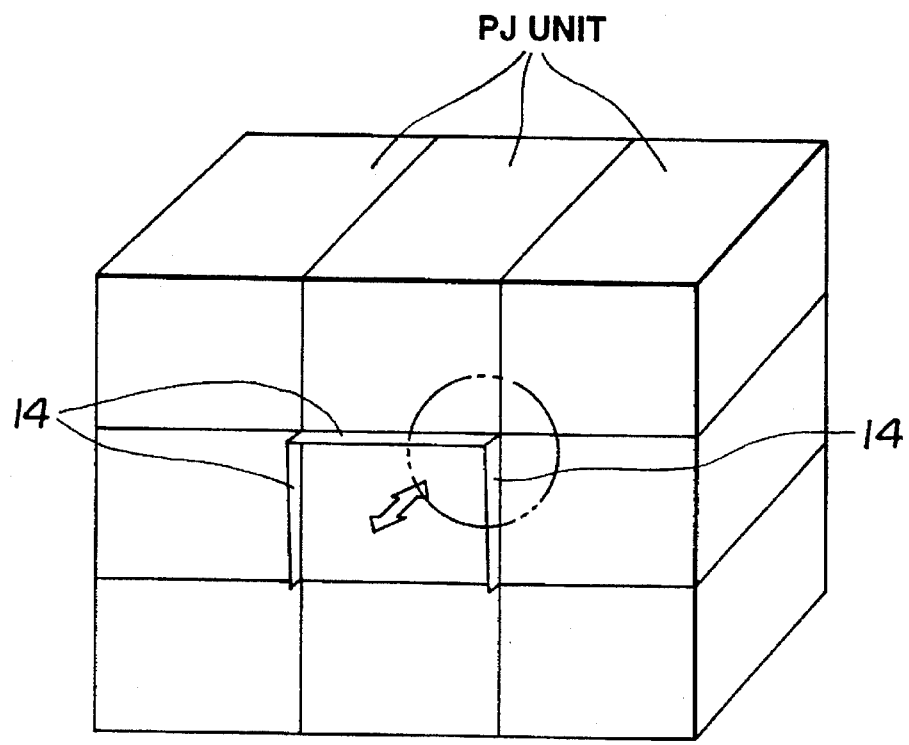
FIG. 20(a) is a perspective view for explaining the screen replacing operation in the multiscreen displaying apparatus in which PJ units are piled up.
Figure 20B:
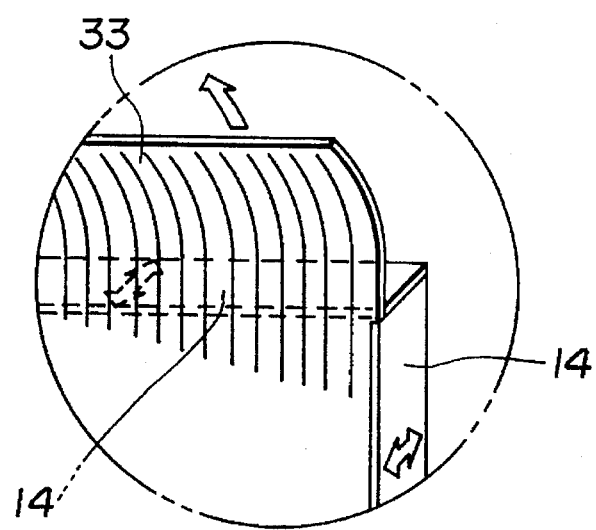
FIG. 20(b) is a partly magnified view of FIG. 20(a).

As shown in FIGS. 20(a) and (b), the screen replacing operation in FIGS. 16 to 19 is possible with the state of the multiscreen displaying apparatus wherein the PJ units are piled up because, as shown in FIG. 12, the gap 17 is formed between the PJ units.

By the way, in FIGS. 16 to 19 and 20(a) and (b), the operating example of replacing the screen when the upper, right and left screen pressing metal fixtures 14 are pushed out (that is, slid) forward but the lower screen pressing metal fixture 14 is not moved (that is, fixed) has been explained. However, it is needless to say that the lower screen pressing metal fixture 14 need not be necessarily fixed. The screen will be able to be replaced, for example, when the right, upper and lower screen pressing metal fixtures 14 are pushed out (that is, slid) forward but the left screen pressing metal fixture 14 is not moved (that is, fixed).

Figure 21:
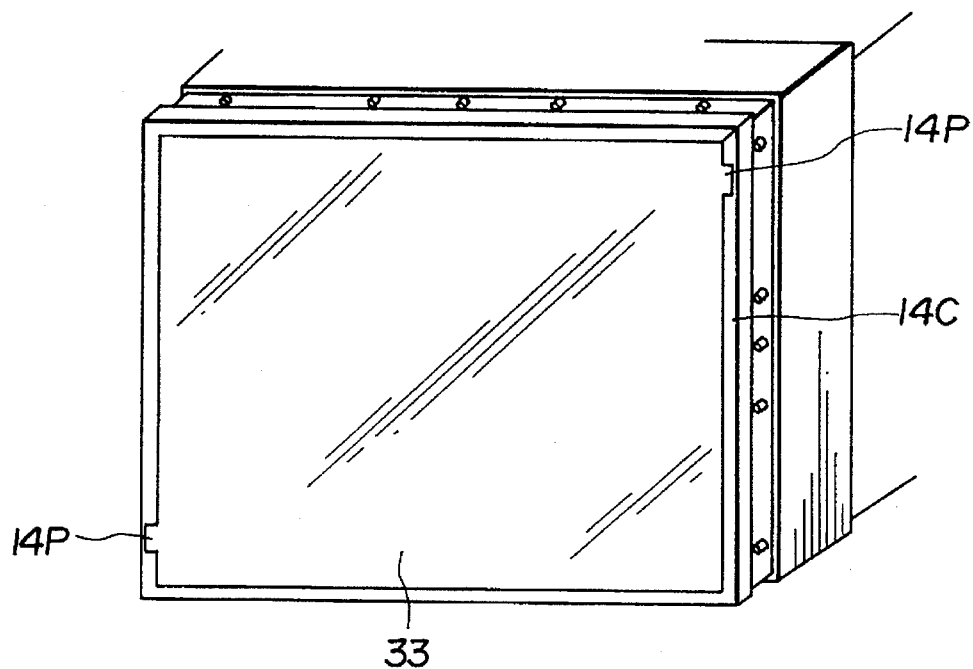
FIG. 21 is a perspective view showing an example of providing a screen removing means in the screen pressing metal fixture locking part in FIG. 10.
Figure 22:
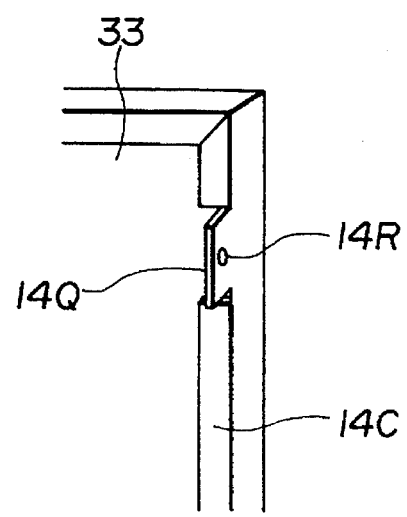
FIG. 22 is a perspective view showing an example of providing a means of pulling out the screen together with the screen pressing metal fixture from outside and removing the screen in the screen pressing metal fixture locking part.
Figure 23:
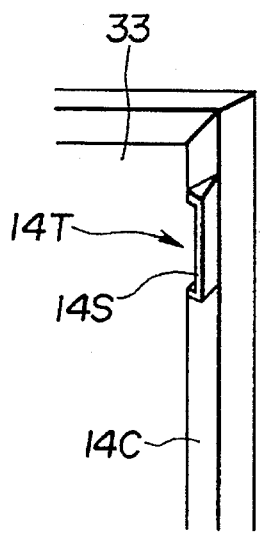
FIG. 23 is a perspective view showing an example of providing another means of pulling out the screen together with the screen pressing metal fixture from outside and removing the screen in the screen pressing metal fixture locking part in FIG. 10.

Another embodiment of the screen pressing metal fixture 14 is shown in FIGS. 21 to 23.

FIG. 21 shows an example of an improvement made by providing the screen pressing metal fixture 14 with an incision as a means of removing the screen 33 to improve the replacing operation.

As shown in FIG. 21, an incision 14P is provided on the surface side of the screen 33. At least two incisions 14P are provided substantially on the diagonal of a PJ unit picture in the drawing. More incisions may be provided. By such method as inserting such tool as a screw driver into the incision 14P, the screen 33 can be more simply removed from the screen pressing metal fixture 14. That is to say, the screen 33 can be easily replaced from outside.

FIG. 22 shows an example of a further improvement so that the screen 33 will be able to be removed from outside the screen. A projection 14Q is provided by cutting and raising the metal fixture part of the incision 14P in FIG. 21 and is further provided with a hole 14R. Therefore, when a wire is passed through this hole 14R, the screen pressing metal fixture 14 will be able to be pulled out to the surface side of the screen 33. By such formation, in the replacing operation, it will not be necessary to push the screen from inside and the operation will be able to be made outside.

FIG. 23 shows an example of further improving the embodiment in FIG. 21 so that the screen 33 may be removed. As a means of removing the screen, a swollen part 14T is provided on the surface side of the screen 33. This part 14T is worked, for example, by a press-out work (so called plastic transforming work) so that only the end side 14S bent to the screen side may float from the screen surface. Therefore, by such method as inserting such tool as a screw driver into this part 14S, the screen pressing metal fixture 14 will be able to be pulled out and the screen 33 will be able to be simply removed from the screen pressing metal fixture 14. That is, the screen 33 will be able to be easily replaced from outside.

By the way, it is needless to say that the screen removing means of the screen pressing metal fixture shown in FIGS. 21 to 23 can be applied not only to the metal fixture 14 of the form shown in FIG. 11 but also to the metal fixtures 14M and 14N of the forms shown in FIGS. 14 and 15.

As described above, as the screen pressing metal fixtures 14 (or 14M or 14N) formed movably with the stepped part 15A of the screw and the head 18 of the screw as axes, even in case the units are piled up, as shown in FIG. 12, the screen pressing metal fixtures 14 (or 14M or 14N) together with the screen 33 will be able to be easily moved to the surface side of the screen. Further, said screen pressing metal fixture 14 (or 14M or 14N) is formed of a thin metal and is therefore elastic. When the frame of the screen 33 part is opened outside with a tool, the screen 33 will be able to be simply removed.

As the space part 17 is provided on the screen side between the adjacent PJ units, the same effect as of the space part 27 provided in the conventional example will be obtained and there will be an effect that the screen 33 will be able to be always held under a proper tension. By the way, this space part 17 is so smaller than in the conventional example that the picture will not be hard to see in the joint.

In this invention, in the locking part 14C or 14F of the screen pressing metal fixture 14, 14M or 14N forming the first holding means, as a screen removing means, the incised part 14P and the projected part 14Q or swollen part 14T made by cutting and raising the incised part without cutting and removing it are respectively separately provided. However, the present invention is not limited to it. The incised part 14P and projected part 14Q or the incised part 14P and swollen part 14T may be respectively combined and provided in the locking part 14C or 14F of the screen pressing metal fixture 14, 14M or 14N.

According to the embodiment of the invention explained in said FIGS. 10 to 23, there are the following effects.

First, after the PJ units are piled in steps, in case the screen surface is hurt and must be replaced, the screen will be able to be replaced without breaking the multiscreen displaying apparatus made by piling the PJ units. Therefore, the replacing operation will be easy, new parts will not be added and the screen will be able to be more positively fixed with a simple formation.

Second, as a space part is provided between the adjacent PJ units by using a thin metal for the screen pressing metal fixture forming the first holding means, the same effect as of the space part provided in the conventional example will be obtained and there will be an effect that the screen will be able to be held under a proper tension so that the picture will not be hard to see in the joint. In removing the screen, after the screen is moved, when the first holding means formed of the thin metal is only opened outside, the screen will be able to be simply removed. Further, in case the screen is to be fitted, if this metal fixture is opened outside and the screen is only inserted and fitted in the first holding means, the first holding means will be recovered to press the screen with a resilient force and therefore there will be an effect that the screen will be able to be simply replaced.

Third, as the first holding means has a spring back function, there will be effects that the screen will be positively fixed and that the screen will be able to be prevented from springing out unexpectedly during the transportation or operation.

Fourth, as the screen fitting position is regulated by at least one column part arranged on the end side of the screen fitting frame, the screen will be able to be more positively and safely fitted.

Fifth, as a means for removing the screen to be replaced is provided in the first holding means locking part, there will be an effect that the screen removing operation will be simpler.

Sixth, as a screen removing means in replacing the screen is provided in the first holding means locking part, there will be effects that a wire will be hung on a hole provided in this removing means and the first holding means together with the screen will be able to be pulled out and that all the replacing operation will be able to be made from outside the multiscreen display.

Seventh, as the screen can be pulled out together with the first holding means by inserting such tool as a screw driver into a swollen part provided in the first holding means locking part, there will be an effect that all the replacing operation will be able to be made from outside the multi-screen display.

By the way, the present invention is not limited only to the above described embodiments but can be variously modified and worked within a range not deviating from the purport of the invention.

What is claimed is:

1. A multiscreen displaying apparatus formed of plural projecting units to produce large type multivideos, said displaying apparatus comprising:
   projecting units each having a structure defining a front cabinet and a rear cabinet;
   a screen fitted to said front cabinet constructed and arranged to display a video projected from a back surface side thereof;
   an optical unit box, held within said rear cabinet, comprising a circuit part, projecting tube part and a lens part to project videos onto said screen; and
   a mechanism constructed and arrange to contain said rear cabinet inside said front cabinet such that said rear cabinet may be slidable within said front cabinet;
   screen holding structure mounting said screen to the front end part of said cabinet so that the screen is slidable forwardly and rearwardly with respect to the front end part of said front cabinet
   wherein said rear cabinet is formed to be basket-shaped so that a substantial portion of said optical unit box may be exposed.

2. A multiscreen displaying apparatus formed of plural projecting units to produce large type multivideos, said displaying apparatus comprising:
   projecting units each having a structure defining a front cabinet and a rear cabinet;
   a screen fitted to said front cabinet constructed and arranged to display a video projected from a back surface side thereof;
   an optical unit box, held within said rear cabinet, comprising a circuit part, projecting tube part and a lens part to project videos onto said screen; and
   a mechanism constructed and arrange to contain said rear cabinet inside said front cabinet such that said rear cabinet may be slidable within said front cabinet;
   wherein said rear cabinet is formed to be basket-shaped so that a substantial portion of said optical unit box may be exposed.

3. A multiscreen displaying apparatus formed of plural projecting units to produce large type multivideos, said multiscreen displaying apparatus comprising:
   projection units each having a structure defining a front cabinet and a rear cabinet;
   a screen,
   holding means for slidably mounting said screen on a front side of said front cabinet;
   an optical unit box, for projecting an image on said screen from a rear of the screen, which is held in said rear cabinet and includes a circuit part, a projecting tube part, and a lens part; and
   a guiding structure for accommodating said rear cabinet in said front cabinet by sliding the rear cabinet into the front cabinet;
   wherein said rear cabinet is in the form of a basket, thereby exposing a substantial portion of said optical unit box.

4. A multiscreen displaying apparatus formed of plural projecting units to produce large type multivideos, said multiscreen displaying apparatus comprising:
   projecting units each having a structure defining a front cabinet and a rear cabinet;
   a screen mounted on a front side of said cabinet;
   an optical unit box, for projecting an image on said screen from a rear of the screen, which is held in said rear cabinet and includes a circuit part, a projecting tube part, and a lens part; and
   a guiding structure for accommodating said rear cabinet in said front cabinet by sliding the rear cabinet into the front cabinet;
   wherein said rear cabinet is in the form of a basket, thereby exposing a substantial portion of said optical unit box.

5. A multiscreen displaying apparatus formed of plural projecting units arranged vertically and horizontally to produce large type multivideos, each said projecting unit comprising:
   a cabinet;
   a screen, mounted on a front side of said cabinet,
   holding means for mounting said screen such that said screen may slide independently forwardly and backwardly with respect to the cabinet, with said projecting units arranged vertically and horizontally; and
   an optical unit box for projecting an image on said screen from a rear portion thereof, said optical unit box being held in said cabinet.

6. A multiscreen displaying apparatus according to claim 3 or 4 wherein said guiding structure for accommodating said rear cabinet inside said front cabinet comprises:

a flange part provided opposite said screen;

plural shafts provided in said rear cabinet so as to pass through said flange part;

stoppers fitted on said plural shafts; and a skeleton frame provided within said rear cabinet so as to hold said optical unit box.

7. A multiscreen displaying apparatus according to claim 6 wherein a position to which said rear cabinet is pulled out of said front cabinet until it is stopped is a position wherein the video projected onto said screen from said optical unit box becomes a normal focal distance in an optical design.

8. A multiscreen displaying apparatus according to claim 6 wherein said rear cabinet comprises:

a first groove provided near said stoppers in each of at least right and left shafts among said plural shafts; and a second groove provided at a position opposite said stoppers and disposed in each of the first and second shafts, and said front cabinet comprises:

a positioning metal fixture stopper provided at a rear end of said flange part constructed and arranged to engage with either of said first and second grooves so as to lock the rear cabinet with respect to the front cabinet.

9. A multiscreen displaying apparatus according to claim 8 wherein said first groove is provided in a position in which video projected from said optical unit box held within said rear cabinet becomes a normal focal distance in an optical design for said screen and in which said first groove is locked by said positioning metal fixture stopper and said second groove is provided in a position in which said rear cabinet is contained inside said cabinet and a total length of the projecting unit becomes shortest and in which said second rear cabinet is locked by said positioning metal fixture stopper.

10. A multiscreen displaying apparatus according to claim 6 wherein said rear cabinet comprises:

a first nut provided near a first shaft of said plural shafts and disposed on a stopper;

a second nut provided near a second shaft of said plural shafts opposite the first shaft, said second nut being disposed on another stopper;

wherein a third shaft of said plural shafts has a bolt at a tip thereof and is fitted with said first nut through the rear end part of said rear cabinet and through said flange part in parallel with said first shaft from outside the rear end of said rear cabinet; and wherein a fourth shaft of said plural shafts has a bolt at a tip thereof and is fitted with said second nut through the rear end part of said rear cabinet and through said flange part in parallel with said second shaft from outside the rear end of said rear cabinet and said first nut and the third shaft are screwed and fixed and said second nut and the fourth shaft are screwed and fixed.

11. A multiscreen displaying apparatus according to claim 6 wherein said rear cabinet comprises:

a first bolt provided near a first shaft of said plural shafts and disposed on a stopper;

a second bolt provided near a second shaft of said plural shaft opposite said first shaft, said second bolt being disposed on another stopper;

wherein a third shaft of said plural shafts has a nut at a tip thereof and is fitted with said first bolt through a rear end part of said rear cabinet and through said flange part in parallel with said first shaft from outside a rear end of said rear cabinet; and wherein a fourth shaft of said plural shafts has a nut at a tip and fitted with said second bolt through the rear end part of said rear cabinet and through said flange part in parallel with said second shaft from outside the rear end of said rear cabinet and said first bolt and the third shaft are screwed and fixed and said second bolt and the fourth shaft are screwed and fixed.

12. A multiscreen displaying apparatus according to claim 8 wherein said rear cabinet includes:

a first shaft positioned in a place most separated from the shaft provided with said first and second grooves among left side plural shafts of said plural shafts;

a second shaft positioned in a place most separated from the shaft provided with said first and second grooves among right side plural shafts of said plural shafts;

a first nut provided near said first shaft on said stopper;

a second nut provided near said second shaft on said stopper;

a third shaft having a bolt at a tip thereof and fitted with said first nut through a rear end part of said rear cabinet and through said flange part in parallel with said first shaft from outside a rear end of said rear cabinet; and a fourth shaft having a bolt at a tip thereof and fitted with said second nut through the rear end part of said rear cabinet and through said flange part in parallel with said second shaft from outside the rear end of said rear cabinet and said first nut and the third shaft are screwed and fixed and said second bolt and the fourth shaft are screwed and fixed.

13. A multiscreen displaying apparatus according to claim 8 wherein said rear cabinet comprises:

a first shaft positioned in a place most separated from the shaft provided with said first and second grooves among left side plural shafts of said plural shafts;

a second shaft positioned in a place most separated from the shaft provided with said first and second grooves among right side plural shafts of said plural shafts;

a first bolt provided near said first shaft on said stopper;

a second bolt provided near said second shaft on said stopper;

a third shaft having a nut at a tip thereof and fitted with said first bolt through a rear end part of said rear cabinet and said flange part in parallel with said first shaft from outside a rear end of said rear cabinet; and a fourth shaft having a nut at a tip thereof and fitted with said second bolt through the rear end part of said rear cabinet and said flange part in parallel with said second shaft from outside the rear end of said rear cabinet and said first bolt and the third shaft are screwed and fixed and said second bolt and the fourth shaft are screwed and fixed.

14. A multiscreen displaying apparatus according to claim 3 or 4 wherein said front cabinet comprises:

a rectangular screen fitting frame for fitting said screen to said front cabinet;

a barrel part; and a horizontal beam fitted at an upper front end of said barrel part and projecting from said screen fitting frame.

15. A multiscreen displaying apparatus according to claim 3 or 4 which is assembled by piling up said respective projecting units when said rear cabinet is slidably contained inside said front cabinet.

16. A multiscreen displaying apparatus according to claim 6 wherein a plate which is of the same height as of the upper flat part of said stay, projects toward said flange part and forms a downward inclined surface is provided on the upper front side of a stay at the rear end of the skeleton frame.

17. A multiscreen displaying apparatus formed by vertically and horizontally arranging plural projecting units each provided with a screen on a front surface and containing within a cabinet an optical system magnifying and projecting video lights onto said screen to produce large multivideos, comprising:

a first holding means comprising four plate-like members in which a locking part for locking the screen is provided so that an outer periphery of said projecting units may be enclosed and the screen may be bent at one end to a surface part, and plural substantially elliptic holes are provided at another end so as to be along the outer periphery and to direct the major axis of a substantially elliptic hole toward the screen;

a second holding means including a screen fitting frame arranged on a back surface side of said screen, the screen fitting frame has a large outer periphery of substantially the same shape as of the outer periphery of the screen and is provided integrally with said cabinet, the screen fitting frame is constructed and arranged to hold the screen with said locking part, a female screw part coupling an end part on the screen side of said substantially elliptic hole to hold said first holding means; and a fixing means, including a columnar part having a height larger than a plate thickness of said first holding means, is provided on a head side of plural male screws of the fixing means to be screwed into the female screw parts of the second holding means and said columnar part is inserted through the substantially elliptic hole of said first holding means to movably fix the screen together with the first holding means.

18. A multiscreen displaying apparatus according to claim 17 wherein the first holding means of the respective units arranged between the adjacent projecting units is formed of a thin metal so that these holding means themselves may not contact with each other and a space part is provided between the adjacent first holding means.

19. A multiscreen displaying apparatus according to claim 17 wherein the end on the screen side of said hole provided in said first holding means and said screen fitting frame are bent so that a gap will be obtained between them before said male screw is screwed into the female screw of the screen fitting frame.

20. A multiscreen displaying apparatus according to claim 17 wherein at least one male screw arranged in each end side part of the outer periphery of the screen among plural male screws of said fixing means is not provided with said columnar part to regulate the screen fitting position and is formed of a screw having a head diameter of substantially the same dimension as of the substantially elliptic minor axis direction of said hole.

21. A multiscreen displaying apparatus according to claim 17 wherein a screen removing means comprising an incised part is provided in at least a part of said locking part.

22. A multiscreen displaying apparatus according to claim 17 wherein a screen removing means made by providing a projected part outward from the screen surface by incising and raising at least a part of said locking part and providing a small hole in said projected part is provided.

23. A multiscreen displaying apparatus according to claim 17 wherein a screen removing means comprising a partly swollen part partly projected forward in at least a part of said locking part is provided.

* * * * *